US008121071B2

(12) United States Patent
Polson

(10) Patent No.: US 8,121,071 B2
(45) Date of Patent: *Feb. 21, 2012

(54) GATEWAY NETWORK MULTIPLEXING

(75) Inventor: Peter Polson, Seattle, WA (US)

(73) Assignee: Sierra Wireless America, Inc., Carlsbad, CA (US)

( * ) Notice: Subject to any disclaimer, the term of this patent is extended or adjusted under 35 U.S.C. 154(b) by 1503 days.

This patent is subject to a terminal disclaimer.

(21) Appl. No.: 11/595,380

(22) Filed: Nov. 10, 2006

(65) Prior Publication Data

US 2007/0104168 A1    May 10, 2007

Related U.S. Application Data

(60) Provisional application No. 60/735,719, filed on Nov. 10, 2005.

(51) Int. Cl.
*H04L 12/64* (2006.01)
(52) U.S. Cl. ........ 370/328; 370/330; 370/338; 370/345; 370/354; 370/350; 370/509; 370/352
(58) Field of Classification Search ............... 455/432.1, 455/403, 404.1, 426.2, 550.1
See application file for complete search history.

(56) References Cited

U.S. PATENT DOCUMENTS

| 4,792,948 A | 12/1988 | Hangen et al. |
| 5,179,555 A | 1/1993 | Videlock et al. |
| 6,289,212 B1 | 9/2001 | Stein et al. |
| 6,753,887 B2 | 6/2004 | Carolan et al. |
| 6,768,896 B2 | 7/2004 | Tjalldin et al. |
| 6,801,777 B2 | 10/2004 | Rusch |
| 7,269,727 B1 | 9/2007 | Mukherjee et al. |
| 7,508,754 B1 * | 3/2009 | Sankaranaraynan et al. . 370/225 |
| 7,562,393 B2 * | 7/2009 | Buddhikot et al. ............. 726/26 |
| 7,624,165 B2 | 11/2009 | Tucker et al. |

(Continued)

FOREIGN PATENT DOCUMENTS

GB    2354605 A    3/2001

(Continued)

OTHER PUBLICATIONS

International Search Report, mailed Sep. 20, 2007 for application PCT/US06/043758.

(Continued)

*Primary Examiner* — Charles Appiah
*Assistant Examiner* — Randy Peaches
(74) *Attorney, Agent, or Firm* — Schwabe, Williamson & Wyatt, P.C.

(57) ABSTRACT

A gateway adapted to receive data from a device of a local area network is described herein. In some embodiments, the gateway may be adapted to multiplex received data to another device among multiple wide area networks, wherein at least one of the wide area networks is a wireless wide area network. The gateway may have a wireless wide area networking interface and at least one of one or more other wireless wide area networking interfaces and/or one or more wired wide area networking interfaces, the wired and/or wireless networking interfaces each adapted to transmit data to at least one of the multiple wide area networks. In other embodiments, the gateway may be adapted to transmit the received data to the other device through a preferred wide area network, and, if that network is unavailable or operating conditions determine otherwise, transmit the received data to the other device through a back-up wide area network.

25 Claims, 18 Drawing Sheets

U.S. PATENT DOCUMENTS

| | | |
|---|---|---|
| 2002/0075844 A1 | 6/2002 | Hangen |
| 2002/0085516 A1 | 7/2002 | Bridgelall |
| 2002/0176366 A1 | 11/2002 | Ayyagari et al. |
| 2003/0031153 A1 | 2/2003 | Matsumoto |
| 2003/0035397 A1 | 2/2003 | Haller et al. |
| 2003/0051041 A1 | 3/2003 | Kalavade et al. |
| 2003/0133421 A1 | 7/2003 | Sundar et al. |
| 2004/0037255 A1 | 2/2004 | Joong et al. |
| 2004/0103313 A1 | 5/2004 | Kreiner et al. |
| 2004/0172658 A1 | 9/2004 | Rakib et al. |
| 2004/0185830 A1 | 9/2004 | Joao et al. |
| 2004/0208150 A1 | 10/2004 | Chang et al. |
| 2004/0219948 A1 | 11/2004 | Jones et al. |
| 2005/0053034 A1 | 3/2005 | Chiueh |
| 2005/0085245 A1 | 4/2005 | Danneels |
| 2005/0090248 A1* | 4/2005 | Shen et al. ............... 455/432.1 |
| 2005/0090283 A1 | 4/2005 | Rodriquez |
| 2005/0202825 A1 | 9/2005 | Puranik et al. |
| 2005/0204389 A1 | 9/2005 | Proehl et al. |
| 2005/0226178 A1 | 10/2005 | Forand et al. |
| 2006/0146846 A1 | 7/2006 | Yarvis et al. |

FOREIGN PATENT DOCUMENTS

| | | |
|---|---|---|
| WO | WO2004/070970 A1 | 8/2004 |
| WO | WO 2005/029901 A2 | 3/2005 |

OTHER PUBLICATIONS

International Preliminary Report on Patentability, mailed May 14, 2008 for application PCT/US06/043758.
International Search Report, mailed May 8, 2007 for application PCT/US06/43998.
International Preliminary Report on Patentability, mailed May 8, 2007 for application PCT/US06/43998.
Office Action, mailed Sep. 17, 2008 for U.S. Appl. No. 11/392,454.
Office Action, mailed Apr. 1, 2009 for U.S. Appl. No. 11/392,454.
Office Action, mailed Sep. 30, 2009 for U.S. Appl. No. 11/392,454.
Final Office Action mailed Apr. 12, 2011 for U.S. Appl. No. 11/595,487.
Notice of Allowance mailed Jul. 7, 2011 for U.S. Appl. No. 11/595,487.

* cited by examiner

GATEWAY NETWORK MULTIPLEXING

PRIORITY CLAIM

This application claims priority to U.S. Provisional patent application No. 60/735,719, entitled "LAN/WWAN Gateway Network Multiplexing" and filed on Nov. 10, 2005.

FIELD OF THE INVENTION

Embodiments of the present invention relate to the field of data communication. More specifically, some embodiments of the present invention are related to bridging local area networks (LAN) and wireless wide area networks (WWAN).

BACKGROUND

Advances in microprocessor related technology have lead to widespread development and the adoption of computing devices. Computing powers that used to be available only in expensive mainframe computers requiring special operating environments are now available in many personal-computing (PC) devices. The form factors vary from desktop, laptop, palm-sized, and so forth. A number of these computing devices are packaged as "purpose" devices, such as set-top boxes, entertainment personal digital assistants (PDA), pagers, text messengers, game devices, smart appliances and wireless mobile phones.

Concurrently, advances in networking, telecommunications and related technologies, in particular, in the area of wireless networking/communications, have led to increased connectivity between computing devices over local, private, wide area, and/or public networks. Of particular notoriety is the Internet.

Today, local area networks may be wired or wireless. Similarly, wide area networks may be wired or wireless. Examples of the former include UWB, Ethernet, serial, WiFi, and Bluetooth. Examples of the latter include cellular, PCS, or WiMAX wireless networks offered by various wireless network service providers, such as Cingular, Sprint, T-Mobile, and Clearwire.

BRIEF DESCRIPTION OF THE DRAWINGS

The present invention will be described by way of exemplary embodiments but not limitations, illustrated in the accompanying drawings in which like references denote similar elements, and in which.

DETAILED DESCRIPTION OF ILLUSTRATIVE EMBODIMENTS

Figure 1:
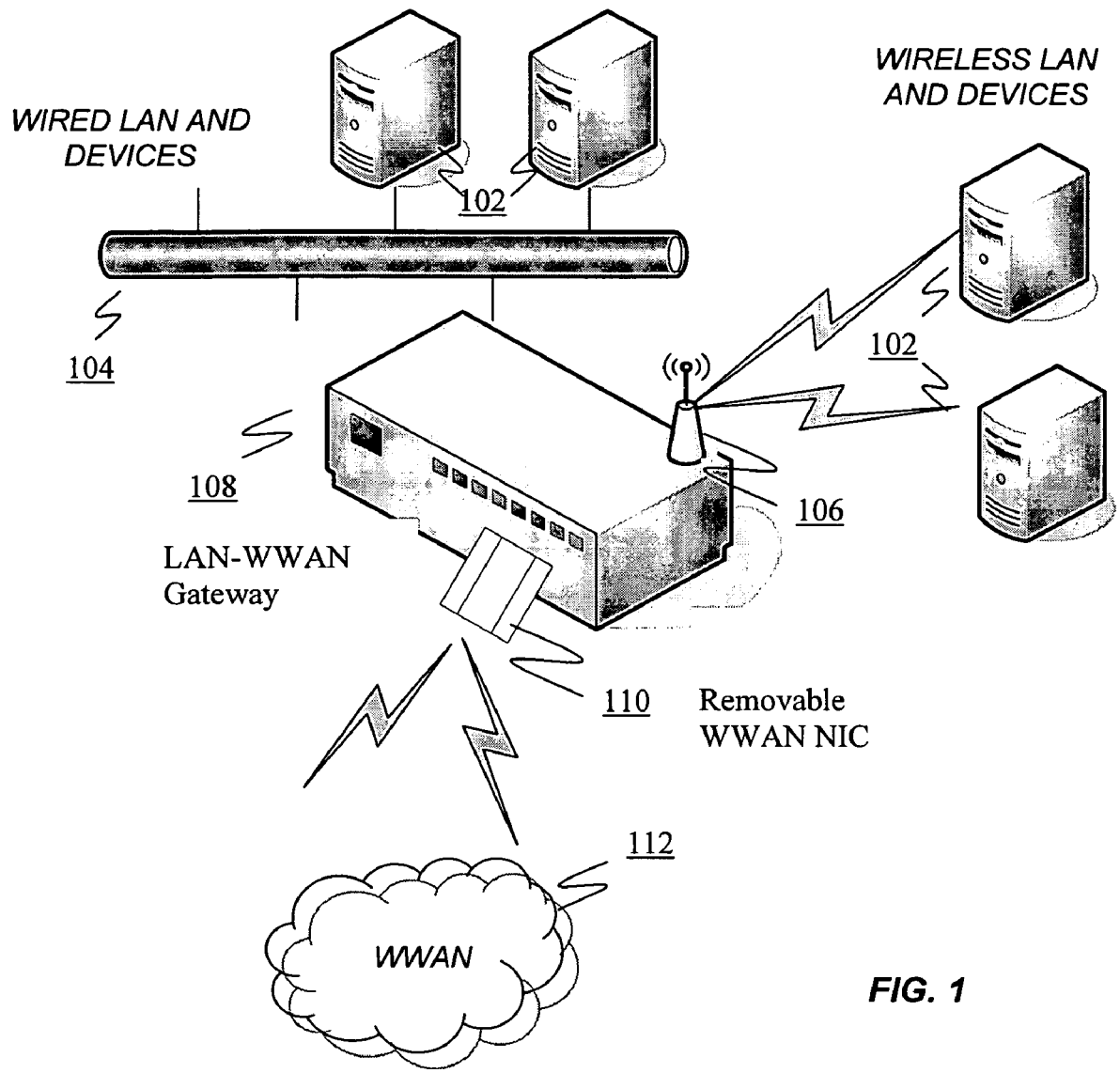
FIG. 1 illustrates a system view of an example operating environment suitable for use to practice the present invention, in accordance with various embodiments.

Illustrative embodiments of the present invention include but are not limited to methods and apparatuses for receiving, by a gateway, data from devices of a local area network. In some embodiments, the gateway may be adapted to multiplex the received data to other devices among multiple wide area networks, wherein at least one of the wide area networks is a wireless wide area network. The gateway may have a wireless wide area networking interface and at least one of one or more other wireless wide area networking interfaces and/or one or more wired wide area networking interfaces, the wired and/or wireless networking interfaces each adapted to transmit data to at least a corresponding one of the multiple wide area networks. In other embodiments, the gateway may be adapted to transmit the received data to the other devices through a wide area network interface corresponding to a preferred wide area network, if the preferred wide area network is available, optimally operating and/or otherwise adequate, and, if that network is unavailable, sub-optimally operating and/or inadequate, transmit the received data to the other devices through another wide area network interface corresponding to a back-up wide area network, if the back-up wide area network is available (and operating with greater bandwidth and/or performance over the preferred wide area network).

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in one embodiment" is used repeatedly. The phrase generally does not refer to the same embodiment; however, it may. The terms "comprising," "having," and "including" are synonymous, unless the context dictates otherwise. The phrase "A/B" means "A or B". The phrase "A and/or B" means "(A), (B), or (A and B)". The phrase "at least one of A, B and C" means "(A), (B), (C), (A and B), (A and C), (B and C) or (A, B and C)". The phrase "(A) B" means "(B) or (A B)", that is, A is optional.

FIG. 1 illustrates a system view of an example operating environment suitable for use to practice the present invention, in accordance with various embodiments. As illustrated, gateway 108 has one or more local networking interfaces, such as wireless LAN interface 106, adapted to receive data from, and transmit data to one or more devices 102 of one or more LANs, such as the wireless LAN shown as connected to gateway 108 through local networking interface 106. Gateway 108 further comprises a socket adapted to removably receive a selected one of a first and a second WWAN networking interface, such as WWAN networking interface 110, the interface adapted to receive data from, and transmit data to a recipient gateway device through a first and/or a second WWAN, such as WWAN 112. Additionally, gateway 108 comprises a routing engine coupled to a local networking interface and the socket, and adapted to transmit data received from one or more devices 102 of a LAN 104 to a recipient gateway device through a first WWAN 112, and selectively transmit data received from the recipient gateway device of through first WWAN 112 to the one or more devices 102 of the LAN 104, if a first WWAN networking interface 110 is removably received by a socket of the gateway, and transmit data received from the one or more devices 102 of the LAN 104 to a recipient gateway device through a second WWAN (not shown), and selectively transmit data received from the recipient gateway device through the second WWAN to the one or more devices 102 of the LAN 104, if the second WWAN networking interface is removably received by the socket.

In various embodiments, the one or more devices 102 of one or more LANs may be any sort of computing device known in the art, such as PCs, workstations, servers, PDAs, pagers, text messengers, game devices, smart appliances, wireless mobile phones, cameras, and GPS receivers. The devices may connect to the LAN using any sort of connection known in the art, such as a TCP/IP connection, or an ATM virtual connection. Devices 102 may further receive data from a LAN 104 and may transmit data to the LAN 104. Data to be transmitted and/or received may include both content and requests for content, and may consist of any sequence of zero, one, or more bits.

As shown, gateway 108 may be connected to either a wired and/or a wireless LAN. A LAN connected to gateway 108 may use common standards for data transmission, such as Ethernet, Bluetooth, and 802.11, although the LAN may use any standard for data transmission known in the art. LAN 104 may further comprise a LAN router (not shown) capable of routing LAN traffic between devices 102 of the LAN 104, and of routing traffic from any one or more devices 102 of the LAN 104 that is directed to a WWAN to gateway 108. In alternate embodiments, gateway 108 may additionally act as the LAN router, receiving traffic from one device 102 of LAN 104 and directing traffic back to another device 102 of the same LAN 104. The one or more devices 102 of LAN 104 may all be located in the same building or room, as in the case of a wired LAN, or in the same geographic area, as in the case of a wireless LAN. Because of the geographic proximity and limited number of hops for a given transmission, data may be transferred across a LAN at a high rate of speed.

In some embodiments, local networking interfaces may be of any sort known in the art, including Ethernet interfaces, Bluetooth interfaces, and 802.11 wireless interfaces, such as wireless local networking interface 106. The local networking interface may thus consist of a PC card to be received by a PC card port of gateway 108, a miniPCI wireless interface, an interface embedded into the PCB, or a radio antenna, the PC Card, miniPCI, embedded interface, and/or antenna facilitating 802.11 wireless transmission. The local networking interface may also consist of an Ethernet port of gateway 108 receiving an Ethernet cable, the cable further connected to, in some embodiments, a LAN router.

As is further shown, gateway 108 may have multiple local networking interfaces, such as an interface connected to wired LAN 104 and a wireless local networking interface 106 connected to a wireless LAN. In alternate embodiments, gateway 108 may comprise multiple wired LAN interfaces, multiple wireless LAN interfaces, or some combination of one or more of both. Additionally, the routing engine of gateway 108 described above may be further adapted to transmit data received from a device 102 of one LAN 104 to another device 102 of a second LAN.

Additionally, in various embodiments, gateway 108 may further comprise a configuration/management process (not shown) to provide a LAN IP address to all devices 102 of a LAN 104 that may not change if the WWAN 112 is temporarily disconnected. Thus, transmission of LAN-to-LAN traffic is facilitated even in the absence of a WWAN connection.

Further, as is used herein, the term "gateway" refers to any computing device facilitating transmission of data from one or more LANs to a WWAN, and transmission of data from the WWAN to one or more of the one or more LANs. The interfaces, sockets, routing engine, other processes, and storage comprising the gateway 108 may, in some embodiments comprise a single enclosure. Additionally, gateway 108 may be provided with LED lights and display screens on the gateway 108 or on an attached peripheral device to indicate the status of the gateway 108 as well as the status of the LAN and/or WWAN connections.

In some embodiments, gateway 108 may be adapted to be powered through a wall outlet, a vehicle power adapter, or an internal or external battery. Inclusion of the latter power supplies enables the gateway 108 to be used in portable settings. For example, teams of users may carry the gateway 108 in a briefcase or bag. Gateway 108 may also be mounted in a building, vehicle, server rack, or other fixed location.

Also, gateway 108 may adjust the power available to the LAN or WWAN network interfaces 106/110 to improve performance. For example, more power to either the LAN or WWAN network interfaces 106/110 may improve the speed, persistence, and reliability of the interface. Less power to either interface may reduce the power requirements of the gateway 108 and, when used with a battery, extend the operating time before the battery power is drained.

The routing engine of gateway 108 may, in some embodiments, facilitate two-way transmission of data to and from the one or more LANs and to and from one or more WWANs. Transmission of data from one device 102 of a LAN 104 to another device 102 of a second LAN is described in greater detail above.

When receiving data from a device 102 of a LAN 104 destined for a WWAN 112, the routing engine of gateway 108 may, in some embodiments, determine if the data received from the device 102 is a request for content from the WWAN 112, and may further determine if such content is cached in storage of gateway 108. If the content is cached, the routing engine may simply retrieve the requested content from the storage of gateway 108, and transmit the content to the device 102 of LAN 104 requesting the content. In such embodiments, no current connection to WWAN 112 is required.

If on the other hand the content is not cached, or the data received from device 102 of LAN 104 is not a request for content, the routing engine may, in various embodiments, compress the received data prior to transmitting it. By compressing the data, the routing engine may facilitate transmission of the data at a higher speed than might otherwise be achieved, especially given the typically low speeds at which data is transmitted across a WWAN. Such compression may be achieved through recourse to any compression algorithm known in the art, such as Huffman, Lempel-Ziv, or Venturi, or any combination of such algorithms.

In some embodiments, after compressing the received data, the routing engine of gateway 108 may determine whether the gateway 108 is connected to any gateway of any WWAN 112 before attempting transmission of data to the WWAN 112. The routing engine may determine whether a connection exists by pinging an address of a WWAN 112 and listening for a reply. If no reply is received, the routing engine may wait some pre-determined time and try again. After a certain number of attempts have been met without success, the routing engine may, in some embodiments, buffer the data to be transmitted in some sort of data structure and continue on an intermittent basis to attempt connection to the WWAN 112. Once a connection has been achieved, the buffered data may then be transmitted to its appropriate destination.

In other embodiments, gateway 108 may also include a networking interface to receive a wired WAN connection. Such a connection may be achieved via an Ethernet plug and cable received into an Ethernet port of the gateway 108. In such embodiments, the wired WAN connection may serve as a backup that the gateway 108 may switch to if the WWAN 112 connection is unavailable. Gateway 108 may then attempt connection with the wired WAN, in some embodiments by pinging the wired WAN. If the wired WAN is also unavailable, gateway 108 may buffer the data in the manner described above. In one embodiment, the wired WAN connection may be a wired connection to a wireless device, such as a device having a cellular or satellite modem.

Still in other embodiments, a configuration/management process of gateway 108 such as the one described above may communicate the status of the WWAN 112 to the one or more devices 102 of the one or more LANs 104 through a web page. Such status information may include availability of (connection to) WWAN 112, WWAN 112 signal strength, the WWAN 112 IP address, and statistics about the users and data being transmitted through the WWAN 112.

In various embodiments, a configuration/management process of gateway 108 may be adapted to shut down or otherwise restrict transmission to the LAN 104 or a second LAN when no WWAN 112 access is available.

Additionally, in some embodiments, gateway 108 may be adapted to prioritize specific data over the WWAN 112 to manage conflicts between devices 102 of LANs 104 that are sharing limited WWAN 112 capacity.

Once a connection to WWAN 112 has been determined to exist, however, the routing engine of gateway 108 may transmit the received data to its destination via the connected WWAN 112.

In still other embodiments, the routing engine of gateway 108 is adapted to transmit data received from a WWAN 112 to one or more devices 102 of one or more LANs 104. Upon receiving the data from WWAN 112, the routing engine may first, in various embodiments, decompress the data, if the data is compressed. As mentioned above, compression of data may result in higher transmission speeds across a WWAN 112, and may also be used to lower the connectivity cost to a user and reduce the load for a carrier. The routing engine may employ any compression algorithm known in the art to achieve decompression of the data, such algorithms including Huffman, Lempel-Ziv, Venturi, or any combination of such algorithms.

Upon decompressing the data, the routing engine may, in some embodiments, next determine if the data is content received from a device of a WWAN 112. If the data is determined to comprise some sort of content, such as a web page, a PDF, or any other sort of content known in the art, the routing engine may then determine if the content is cached in storage of gateway 108. If the received content is not cached, the routing engine, in various embodiments, may cache the content received from the WWAN 112 in a data structure of some type known in the art, and store the cached content in storage of gateway 108.

In some embodiments, the routing engine of gateway 108 may then transmit the received data to its destination device 102 via the LAN 104 to which destination device 102 is connected.

As is further shown, gateway 108 comprises a socket adapted to receive a WWAN networking interface 110. The WWAN networking interface 110 may be of any sort known in the art, such as cellular, PCS, and WiMax WWAN networking interfaces. The interface may come in the form of a PC Card or Modem, the PC Card or Modem capable of plugging into the socket of gateway 108.

In various embodiments, each WWAN networking interface may be adapted for a specific wireless service provider. Thus, gateway 108 facilitates the switching of WWAN networking interfaces in areas where another provider having a different WWAN networking interface is stronger, or where the provider associated with the current WWAN networking interface 110 does not provide service. Accordingly, the use of multiple WWAN networking interfaces 110 with the socket of gateway 108 facilitates the mobility of the gateway 108, as described above.

In still other embodiments not illustrated, gateway 108 may support multiple WWAN networking interfaces removably received by multiple sockets of gateway 108. By employing multiple sockets and multiple WWAN networking interfaces 110, gateway 108 may facilitate connection to multiple WWAN service providers. If WWAN 112 is not available because of the location of the user or issues with the service provider of the WWAN 112, WWAN access may be provided via the other WWAN connection. However, one or more of the WWAN networking interfaces may be built in. Additionally, the gateway 108 may be adapted to support multiple WWAN networking interfaces 110 connecting simultaneously to the same WWAN 112. The combination of networking interfaces may increase the performance, speed, and reliability of the WWAN 112 connection.

As is shown, WWAN 112 may comprise any sort of WWAN known in the art, such as a cellular, a PCS, or a WiMax WWAN. WWAN 112 may consist of a network of routers and gateways, of which gateway 108 is a part, working together to transmit data to various devices connected directly or indirectly to a router or gateway of WWAN 112, such as the devices 102 connected to gateway 108 via LAN 104. The routers and gateways of WWAN 112 may utilize any sort of connection type known in the art, such as TCP/IP connections or ATM virtual connections. Additionally, WWAN 112 may provide access to the Internet through another gateway or set of gateways.

In further embodiments, the gateway 108 may provide radio antenna enhancements for the WWAN 112 through either a passive or an active antennas apparatus in gateway 108. This antenna apparatus may be directional or omnidirectional. The radio antenna enhancements may improve the reliability, throughput, and performance of the WWAN 112. The enhancements may also provide improved performance for other nearby, unrelated devices using a WWAN, such phones or modems using cellular, PCS, WiMAX, or other WWAN networks.

Figure 2:
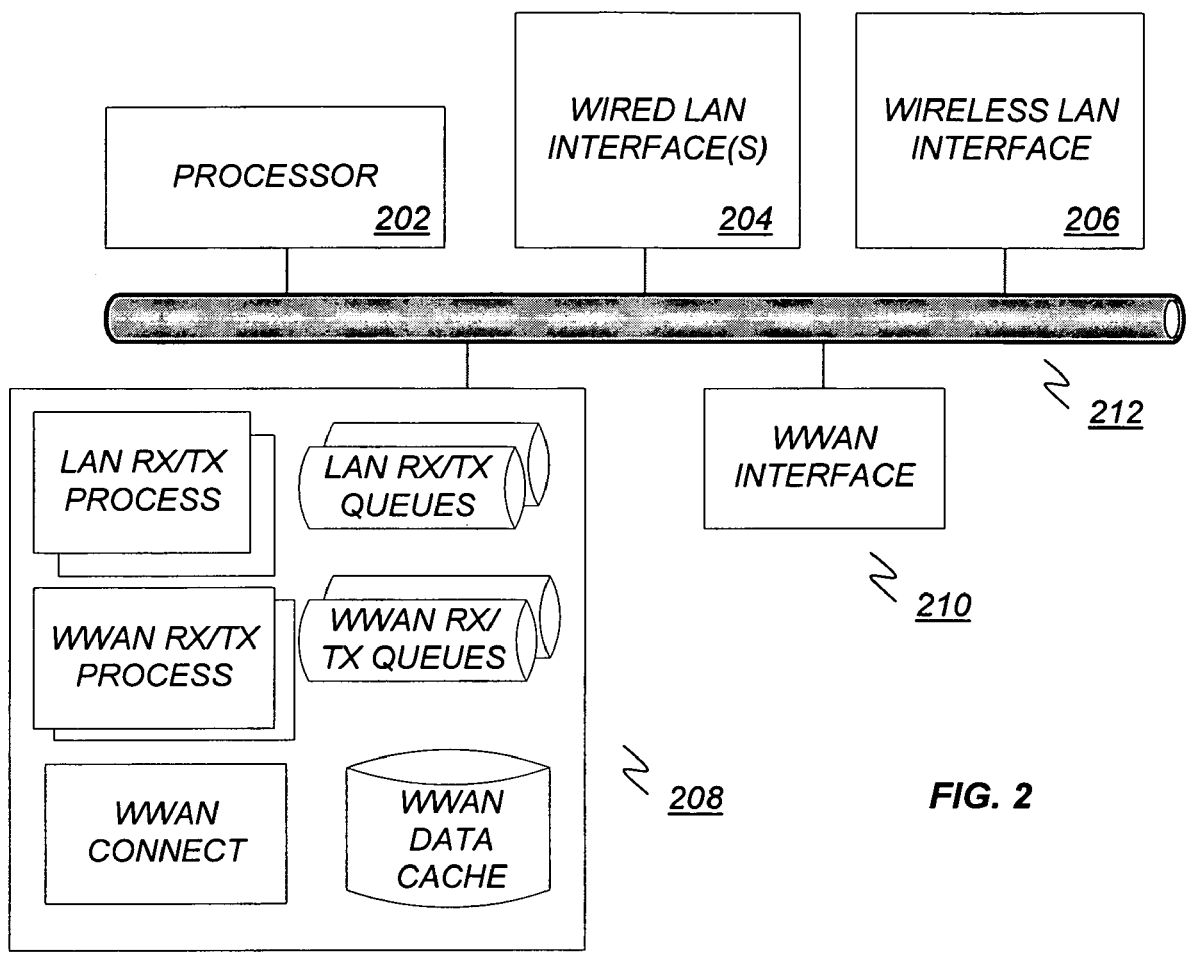
FIG. 2 illustrates an architectural view of a device suitable for use as a LAN-WWAN Gateway, in accordance with various embodiments.

FIG. 2 illustrates an architectural view of a device suitable for use as a LAN-WWAN Gateway, in accordance with various embodiments. As shown, gateway 108 may include one or more processors, such as processor 202 and persistent storage 208. Additionally, gateway 108 includes a plurality of networking interfaces, such as wired LAN interface 204, wireless LAN interface 206, and WWAN interface 210, and wired WAN interface (not shown). The LAN interfaces 204 and 206 may include 802.11, Bluetooth, and Ethernet local networking interfaces, as is described in greater detail above. Also, the WWAN interface 210 may be a cellular, a PCS, or a WiMax WWAN networking interface in the form of a removable PC Card, embedded modem, or other modem to connect to a WWAN 112, the WWAN networking interface also described in greater detail above.

In various embodiments, a card slot (not shown) may be used to allow users of gateway 108 to install or upgrade either the LAN or WWAN interfaces with updated LAN or WWAN interfaces. When new network interfaces and services are available, users can update the gateway 108 to support these interfaces and services by inserting a new interface into the LAN or WWAN card slot.

Further, the elements are coupled to each other via system bus 212, which represents one or more buses. In the case of multiple buses, the buses are bridged by one or more bus bridges (not shown). Each of these elements performs its conventional functions known in the art. In particular, persistent storage 208 is employed to store programming modules adapted to receive and transmit data to and from a LAN (shown as "LAN RX/TX Process"), to receive and transmit data to and from a WWAN (shown as "WWAN RX/TX Process") and to monitor the WWAN connection. Additionally, persistent storage 208 is also employed to store a WWAN data cache of cached WWAN content, and as well as data queues/buffers for data received from LAN 104, data to be transmitted to LAN 104, data received from WWAN 112, and data to be transmitted to WWAN 112. The instructions implementing the programming modules, the WWAN data cache, and the queues/buffers may be loaded into persistent storage 208 in the factory, or in the field, through a distribution medium (not shown) or through LAN and/or WWAN interfaces 204, 206, and/or 210.

Figure 3:
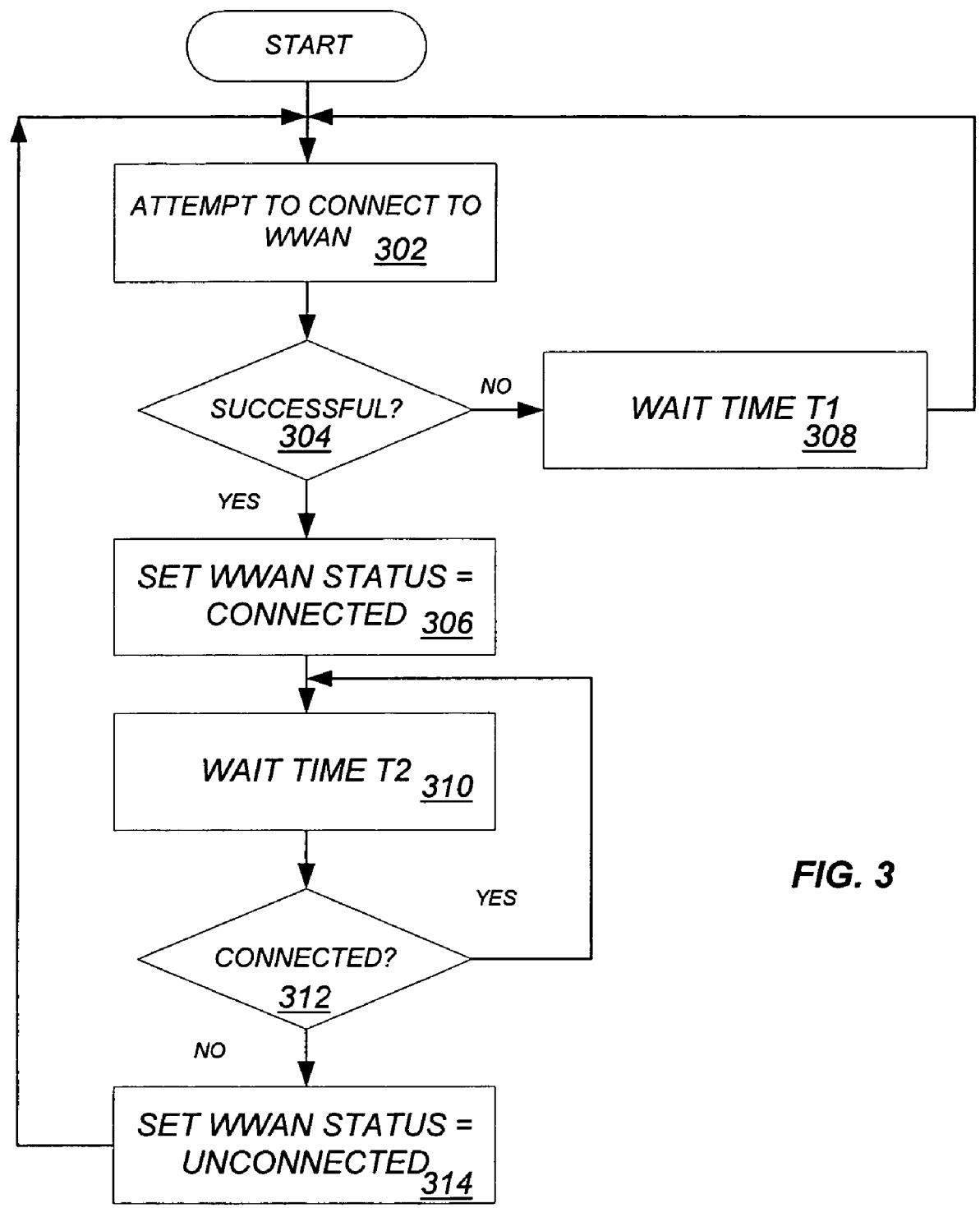
FIG. 3 illustrates the operational flow of selected aspects of a process at the Gateway for maintaining the WWAN connection.

FIG. 3 illustrates the operational flow of selected aspects of a process at the gateway 108 for maintaining the WWAN 112 connection.

In some embodiments, the routing engine of gateway 108 may determine whether the gateway 108 is connected to any gateway of any WWAN 112 before attempting transmission of data to the WWAN 112. As is shown, the routing engine may attempt to connect to a WWAN 112, block 302, by pinging an address of a WWAN 112 and listening for a reply. If no reply is received, block 304, the routing engine may wait some pre-determined time, here shown as time T1, block 308, and try again, block 302. After a certain number of attempts have been met without success, the routing engine may, in some embodiments, buffer the data to be transmitted in some sort of data structure and continue on an intermittent basis to attempt connection to the WWAN 112 (not shown). Once a connection has been achieved, the buffer data may then be transmitted to its appropriate destination. In other embodiments, the routing engine may additionally or instead automatically detect a loss of connection through drivers of gateway 108. The drivers may detect if there is a drop in the connection, at which point the routing engine determines that the WWAN 112 connection has failed. The routing engine may then attempt to reconnect or fail-over.

If on the other hand an attempt to connect to WWAN 112 was successful, block 304, the routing engine may, in some embodiments, set a gateway 108 WWAN connection status variable to "connected," block 306, or where the variable is Boolean, to "true." At some pre-determined time interval, here shown as time T2, block 310, the routing engine may again attempt to connect to WWAN 112 to ensure that the connection still exists, block 312. This may again be accomplished by pinging an address of WWAN 112. If the connection is determined to exist, block 312, the routing engine may again wait a predetermined time T2, block 310, and attempt to connect to WWAN 112 again. On the other hand, if the routing engine determines that a WWAN 112 connection no longer exists, block 312, the routing engine may, in some embodiments, set a gateway 108 WWAN connection status variable to "unconnected," block 314, or where the variable is Boolean, to "false." The WWAN connect process illustrated by FIG. 3 may then again loop back and attempt to reestablish a connection to WWAN 112, block 302.

In various embodiments, not illustrated herein, facilities may be provided to enable a user of gateway 108 to configure the address of the ping and the interval between pings, such as time intervals T1 and T2.

Figure 4:
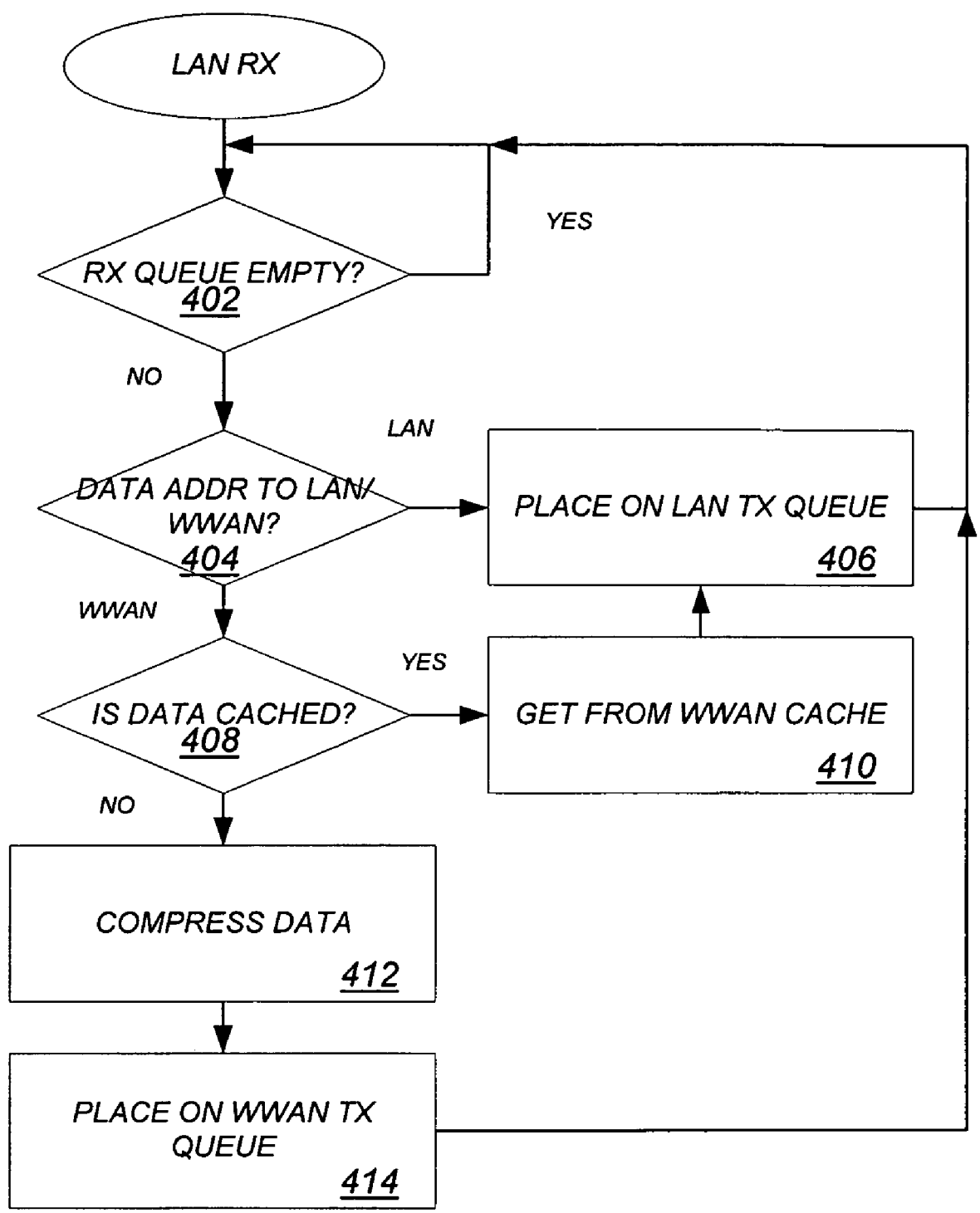
FIG. 4 illustrates the operational flow of selected aspects of a LAN Receive process at the Gateway for handling receipt processing of LAN data.

FIG. 4 illustrates the operational flow of selected aspects of a LAN Receive process at the gateway 108 for handling receipt processing of LAN data. As is illustrated, the routing engine implementing the LAN Receive process may first determine if a LAN Receive Queue of gateway 108 is empty, block 402. The queue may be implemented as any sort of data structure known in the art capable of organizing and storing data. Data received from a LAN may, in some embodiments, first be placed in this receive queue. If empty, the routing engine may check the queue periodically, on some basis, until it is not found to be empty. In other embodiments, received LAN data is processed as it is received, and is not placed in a receive queue. In yet other embodiments, the receive queue may contain buffered LAN data that has been placed in the queue to await transmission while a connection to a WWAN 112 is unavailable.

Upon determining that the receive queue is not empty, the routing engine implementing the LAN Receive process may next determine whether the received LAN data is destined for another device 102 of the same LAN 104 or of a second LAN, or whether the received data is destined for a device accessible over a WWAN 112, block 404. If destined for a device 102 of a LAN 104 or a second LAN, the data may be placed in a LAN Transmit Queue of gateway 108, block 406. The queue may be implemented as any sort of data structure known in the art capable of organizing and storing data. In other embodiments, the data may be transmitted immediately to the destination device 102 without being placed in such a queue.

As is shown, if on the other hand, the data is destined for a device accessible over a WWAN 112, the LAN Receive process of the routing engine may then determine whether the data is cached, block 408. Such a determination may be appropriate where the data received from a device 102 of a LAN 104 is a request for content from a device of a WWAN 112, and the content may be cached in the persistent storage 208 of gateway 108. If the content is cached, the routing engine may simply retrieve the requested content from the storage of gateway 108, block 410, and transmit the content to the device 102 of LAN 104 requesting the content. In alternate embodiments, rather than immediately transmitting the cached content, the LAN Receive process of the routing engine may place the cached content on a LAN Transmit Queue of gateway 108, block 406, such as the one described above. In such embodiments, no current connection to the WWAN 112 is required.

If on the other hand the content is not cached, or the data received from device 102 of LAN 104 is not a request for content, the LAN Receive process implemented by the routing engine may, in various embodiments, compress the received data prior to transmitting it, block 412. By compressing the data, the routing engine may facilitate transmission of the data at a higher speed than might otherwise be achieved, especially given the typically low speeds at which data is transmitted across a WWAN, and may also lower the connectivity cost to a user or reduce the load for a carrier. Such compression may be achieved through recourse to any compression algorithm known in the art, such as Huffman, Lempel-Ziv, or Venturi, or any combination of such algorithms.

After compressing the data, the LAN Receive Process may, in some embodiments, place the data in a WWAN Transmission Queue of gateway 108, block 414, to await transmission across WWAN 112. In alternate embodiments, the routing engine may, immediately following compressing, determine if a WWAN 112 connection exists, as is further illustrated and described above, and if such a connection exists, transmit the data across the WWAN 112 to its destination.

Figure 5:
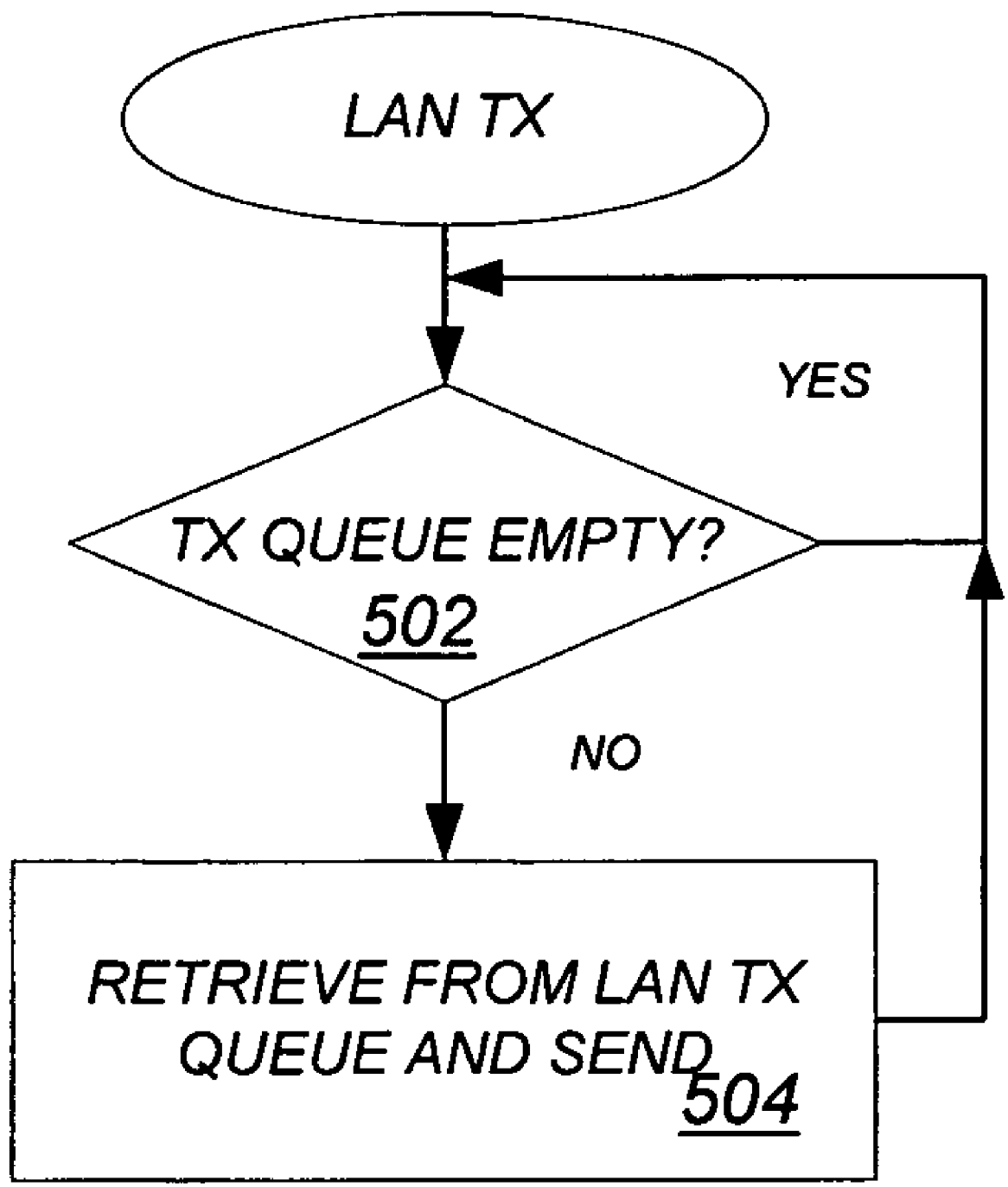
FIG. 5 illustrates the operational flow of selected aspects of a LAN Transmit process at the Gateway for handling transmission processing of LAN data.

FIG. 5 illustrates the operational flow of selected aspects of a LAN Transmit process at the gateway 108 for handling transmission processing of LAN data. As is illustrated, the routing engine implementing the LAN Transmit process may first determine if a LAN Transmit Queue of gateway 108 is empty, block 502. The queue may be implemented as any sort of data structure known in the art capable of organizing and storing data. Data to be transmitted to a device 102 of a LAN 104 may, in some embodiments, first be placed in this transmit queue. If empty, the routing engine may check the queue periodically, on some basis, until it is not found to be empty. In other embodiments, data to be transmitted to a device 102 of the LAN 104 is transmitted immediately after processing, and is not placed in a transmit queue.

As is shown, the LAN Transmit process implemented by the routing engine may next retrieve the data from the LAN Transmit queue and send the data to its destination device 102 via the LAN 104 connected to the gateway 108 via a local networking interface 106, block 504.

Figure 6:
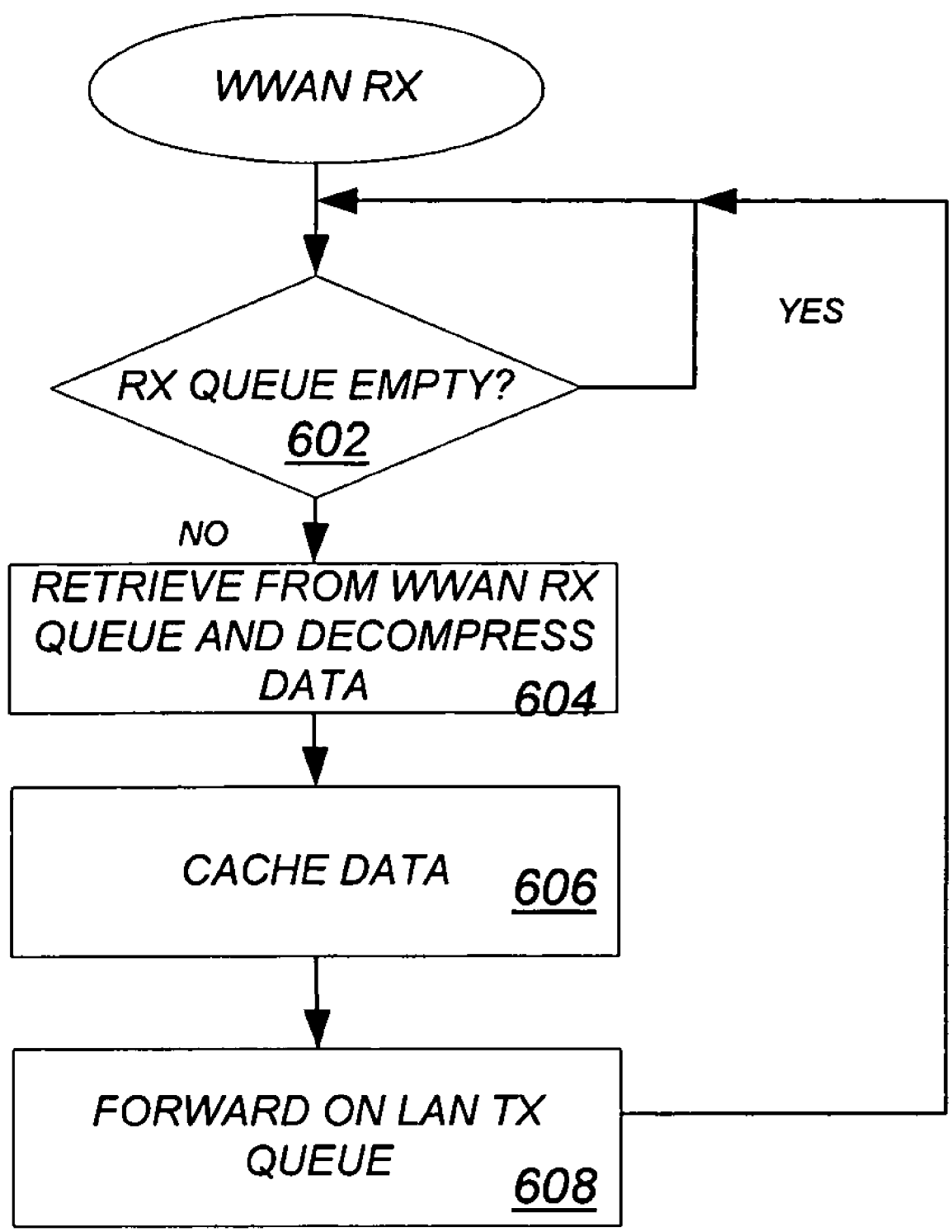
FIG. 6 illustrates the operational flow of selected aspects of a WWAN Receive process at the Gateway for handling receipt processing of WWAN data.

FIG. 6 illustrates the operational flow of selected aspects of a WWAN Receive process at the gateway 108 for handling receipt processing of WWAN data. As is illustrated, the routing engine implementing the WWAN Receive process may first determine if a WWAN Receive Queue of gateway 108 is empty, block 602. The queue may be implemented as any sort of data structure known in the art capable of organizing and storing data. Data received from a WWAN may, in some embodiments, first be placed in this receive queue. If empty, the routing engine may check the queue periodically, on some basis, until it is not found to be empty. In other embodiments, received WWAN data is processed as it is received, and is not placed in a receive queue.

In various embodiments, the WWAN Receive process implemented by the routing engine may next retrieve data from the WWAN receive queue and decompress the received data, block 604, if the data is compressed. As mentioned above, compression of data may result in higher transmission speeds across a WWAN 112, and may also be used to lower the connectivity cost to a user or reduce the load for a carrier. The routing engine may employ any compression algorithm known in the art to achieve decompression of the data, such algorithms including Huffman, Lempel-Ziv, Venturi, or any combination of such algorithms.

Upon decompressing the data, the WWAN Receive process of the routing engine may, in some embodiments, next determine if the data is content received from a device of a WWAN 112. If the data is determined to comprise some sort of content, such as a web page, a PDF, or any other sort of content known in the art, the routing engine may then determine if the content is cached in persistent storage 208 of gateway 108. If the received content is not cached, the routing engine, in various embodiments, may cache the content received from the WWAN 112, block 606, in a data structure of some type known in the art, and store the cached content in the persistent storage 208 of gateway 108. Other caching may be proactive, storing new data at non-peak hours when the WWAN 112 is underutilized.

After caching the data, the WWAN Receive Process may, in some embodiments, place the data in a LAN Transmit Queue of gateway 108, block 608, to await transmission to its destination device 102 of LAN 104. In alternate embodiments, the routing engine may, immediately following caching, transmit the data across the LAN 104 to its destination device 102.

Figure 7:
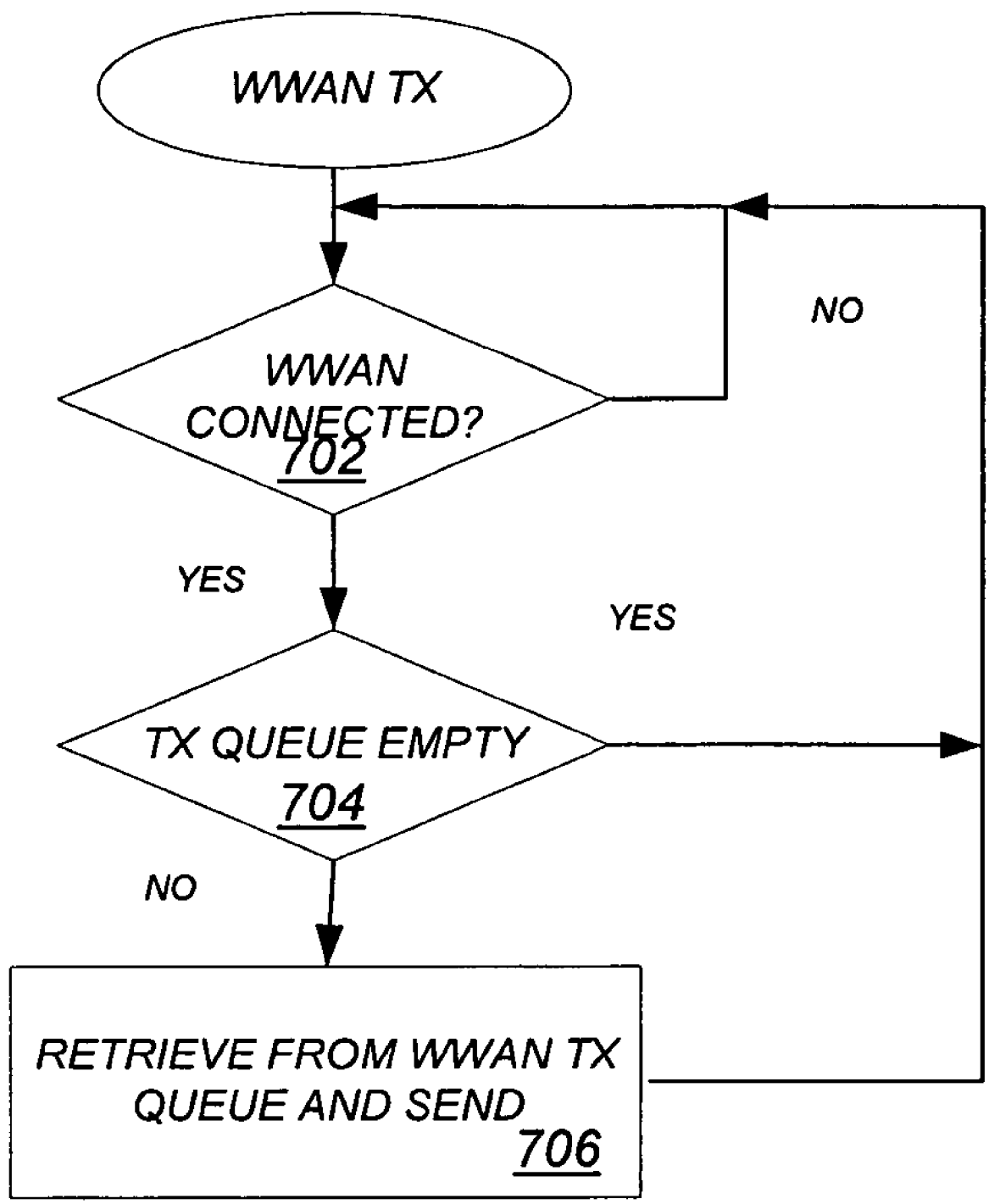
FIG. 7 illustrates the operational flow of selected aspects of a WWAN Transmit process at the Gateway for handling transmission processing of WWAN data.

FIG. 7 illustrates the operational flow of selected aspects of a WWAN Transmit process at the gateway 108 for handling transmission processing of WWAN data. As is illustrated, the routing engine implementing the WWAN Transmit process may first determine if a WWAN 112 connection exists, block 702. The operations for determining whether such a connection exists are illustrated by FIG. 3 and described in greater detail above.

As is shown, the routing engine implementing the WWAN Transmit process may then determine if a WWAN Transmit Queue of gateway 108 is empty, block 704. The queue may be implemented as any sort of data structure known in the art capable of organizing and storing data. Data to be transmitted to a device connected to a WWAN 112 may, in some embodiments, first be placed in this transmit queue. If empty, the routing engine may check the queue periodically, on some basis, until it is not found to be empty. In other embodiments, data to be transmitted to a device of the WWAN 112 is transmitted immediately after processing, and is not placed in a transmit queue.

As is shown, the WWAN Transmit process implemented by the routing engine may next retrieve the data from the WWAN Transmit queue and send the data to its destination device via the WWAN 112 connected to the gateway 108 via a WWAN networking interface 110.

Figure 8:
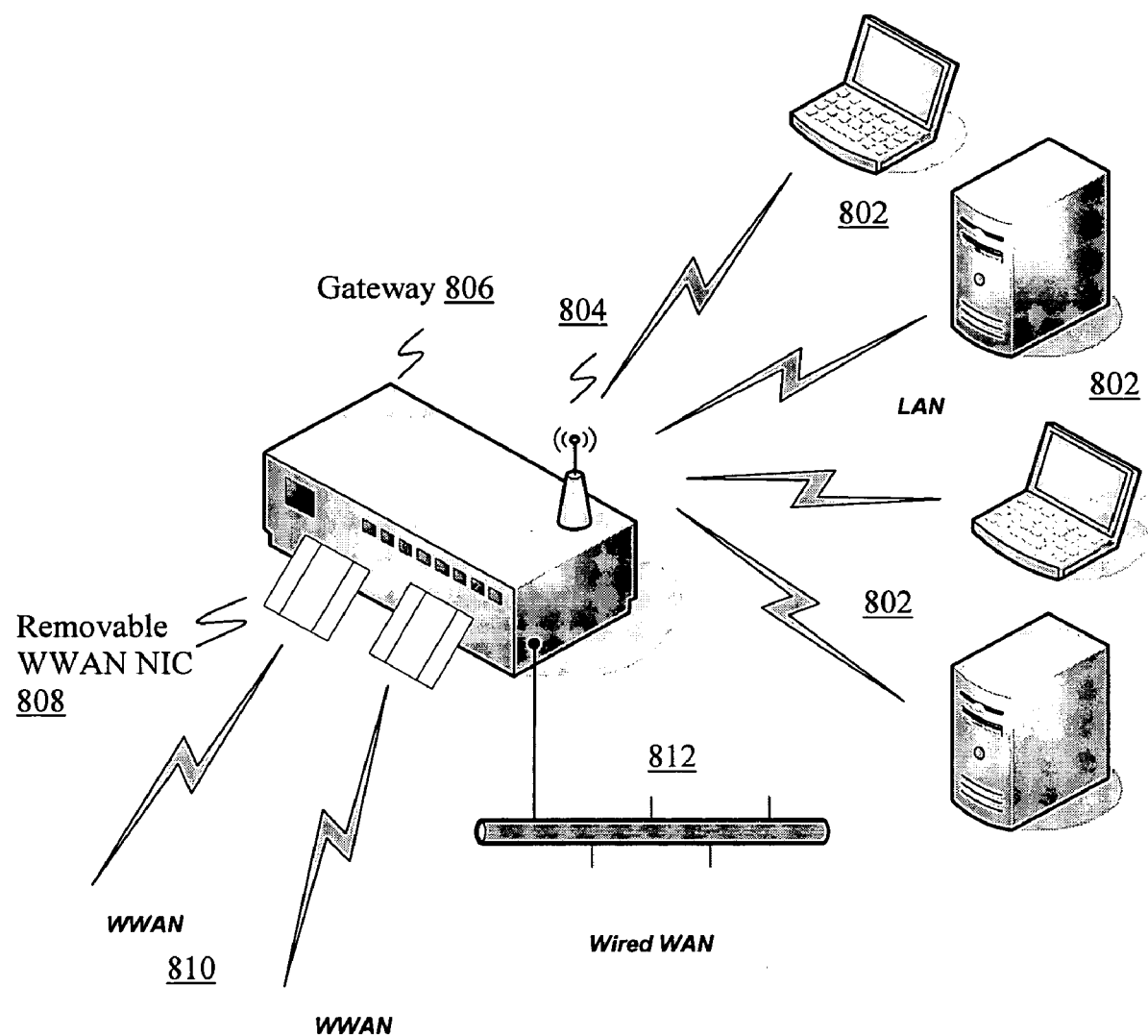
FIG. 8 illustrates a system view of an example operating environment suitable for practicing multiple WAN transmission, in accordance with various embodiments.

FIG. 8 illustrates a system view of an example operating environment suitable for practicing multiple WAN transmission, in accordance with various embodiments. As illustrated, a gateway 806 may include at least one wireless wide area networking interface 808, and in some embodiments may also include one or more wired wide area networking interfaces (internal to gateway 806, and thus not shown). The plurality of networking interfaces of gateway 806 may correspondingly provide connectivity to multiple WANs, such as WWANs 810 and wired WAN 812. Additionally, gateway 806 may have a local area networking interface 804, the interface 804 providing connectivity to a LAN 802. In some embodiments, gateway 806 may be adapted to transmit date received from devices of LAN 802 to other devices (not shown) through one or more of the WANs 810 and 812. In one embodiment, the gateway 806 may simultaneously transmit (multiplex) the received data across a plurality of WANs 810 and 812 (via the corresponding interfaces). In another embodiment, gateway 806 may transmit the received data across a preferred WAN 810/812 (via a corresponding interface) if the preferred WAN 810/812 is available, optimally operating and/or adequate, and if the preferred WAN 810/812 is unavailable, sub-optimally operating and/or inadequate, transmit the data across a back-up WAN 810/812 (via a corresponding interface), if the back up WAN 810/812 is available (and operating with greater bandwidth and/or performance over the preferred WAN 802/812).

LAN 802, local area networking interface 804, gateway 806, wireless wide area networking interfaces 808, and WWANs 810 are described above in detail in reference to FIG. 1, FIG. 1 also showing a gateway, LAN, WWAN, local area networking interface, and wireless wide area networking interface. Gateway 806 may differ from the gateway illustrated by FIG. 1, however, in its abilities to multiplex data across a plurality of WANs and switch transmission of data between, for example, a preferred and a back-up WAN. These and further differences between gateway 806 and the gateway of FIG. 1 are discussed in greater detail below in reference to FIGS. 8 and 9a-9b. Also, the wired wide area networking interface of gateway 806, mentioned above, may be the same sort of interface as the wired local area networking interface shown by FIG. 1 and described above, or may be any sort of wired networking interface known in the art capable of providing connectivity to a wired WAN 812. In some embodiments, the wired interface and wireless interface 808 may be one or more of PCMCIA, miniPCI slots, ExpressCards, PCI Express, USB (providing connectivity to a wired or a wireless WAN), and Ethernet ports.

In various embodiments, wired WAN 812 may be any sort of wired WAN known in the art. Wired WAN 812 may consist of a network of routers and gateways, of which gateway 806 is a part, working together to transmit data to various devices connected directly or indirectly to a router or gateway of wired WAN 812. The routers and gateways of wired WAN 812 may utilize any sort of connection type known in the art, such as TCP/IP connections or ATM virtual connections. Additionally, wired WAN 812 may provide access to the Internet through another gateway or set of gateways.

As mentioned above, gateway 806 may support multiple WANs for multiplexing purposes. Gateway 806 may support multiple WWANs and multiple wired WANs, multiple WWANs and one wired WAN, multiple WWANs and no wired WANs, one WWAN and multiple wired WANs, or one WWAN and one wired WAN. In other embodiments, gateway 806 may support other combinations of WANs for multiplexing purposes.

In some embodiments in which multiple WAN connections are supported by gateway 806, multiple WAN connections may be used simultaneously to multiplex/transmit data received from a device of LAN 802 or from a device connected through one or more of the WANs 810 and 812. Such simultaneous WAN 810/812 usage may increase gateway 806 throughput. In one embodiment, only the number of WANs 810 and 812 determined adequate to handle the traffic of the client devices, such as devices of LAN 802, may be used. Such a determination may be made on a continual basis, a periodic basis (e.g., average traffic over a certain time period), or otherwise, in accordance with various embodiments. In various embodiments, gateway 806 configurability regarding multiple, simultaneous WAN 810/812 use may be based on a wide range of operating conditions, such as signal strength, throughput, carrier ranking (whether user-defined, determined based on other criteria, etc.), or other conditions, as may be supported by the particular embodiment. Also, gateway 806 may facilitate a user in configuring gateway 806 operating conditions relating to WAN 810/812 multiplexing.

In one embodiment, the data are simultaneously transmitted (multiplexed) across the multiple WANs 810 and 812 to a server accessible through the multiple WANs 810 and 812 instead, such as a data center, wherein the server reconstitutes the data streams, and transmits the reconstituted data streams to the one or more destination devices. Such reconstitution may be advantageous, saving the destination devices from the task of recombining the received data.

In other embodiments in which multiple WAN 810/812 connections are available to gateway 806, one WAN 810/812 connection may be used at any one time. Selection by gateway 806 of a preferred, or primary, WAN 810/812 may be performed in a number of ways, such as preferring a certain carrier network, preferring a certain carrier network unless higher throughput is achievable over another accessible WAN 810/812, etc. In various embodiments, such gateway 806 configurability may be based on a wide range of operating conditions, as supported by the particular embodiment. Such operating conditions may include signal strength, throughput, carrier ranking (whether user-defined, determined based on other criteria, etc.), or other conditions. Primary, secondary, and tertiary WAN 810/812 connections (and so forth for additional networks) may be configured, in accordance with various embodiments.

In some embodiments, gateway 806 may give preference to wired WANs 812, if any are available. For example, a wired WAN 812 connection may be used as a default, preferred connection, with a WWAN 810 connection being used secondarily. Such secondary use of the WWAN 810 connection may occur under a variety of conditions, such as, for example, unavailability of the wired WAN 812, or sub-optimal performance of the wired WAN 812, wherein sub-optimal performance is determined by reference to the operating conditions. Also, the wired WAN 812 connection may be supplemented with additional bandwidth of a WWAN 810 connection, as needed or as otherwise configured. For example, for streaming media purposes, or for large downloads or uploads, a supplemental WAN 810/812, such as a WWAN 810 to supplement a preferred wired WAN 812, may be used by gateway 806. In other embodiments, preference may be given to WWANs 810, with a wired WAN 812 connection being used secondarily. Such secondary use of the wired WAN 812 connection may occur under a variety of conditions, such as, for example, unavailability of the WWAN 810, or sub-optimal performance of the wired WAN 810, wherein sub-optimal performance is determined by reference to the operating conditions.

In one embodiment, gateway 108 may turn off/place into dormancy any WAN interfaces that are not currently being used to transmit data. For example, while the back-up WAN 810/812 is not being used, the WAN interface associated with the back-up WAN 810/812 may be turned off/placed into dormancy. This may be advantageous if an unused WAN interface is on a metered rate plan where staying connected is expensive (because charges are incurred for the time or data traffic used on the card).

In various embodiments, supplemental WAN 810/812 use by gateway 806 may occur automatically, initiated by logic of gateway 806, or upon an approval basis, be it periodic, activity specific, or otherwise. Examples of activity specific approvals may be a user prompt at a client device, requesting permission to use a supplemental WAN 810/812, when a user of the client has commenced a download that will take over a certain period of time, or when the user is commencing a high-bandwidth application, such as a streaming media application. In some embodiments, one client may be designated to handle all such approvals for gateway 806. In other embodiments, handling such approvals across multiple clients may be performed in other manners.

In some embodiments, gateway 806 may route traffic between a primary and a secondary WAN 810/812 connection. In other embodiments, a tertiary WAN 810/812 connection (and so forth for additional networks) may also be used by gateway 806. Such multiple, backup WANs 810/812 may be used by gateway 806 for applications where potential downtime is sought to be minimized to the extent possible. In some embodiments, logic of gateway 806 may switch over to a non-primary WAN 810/812, on a non-transitory basis, if the primary WAN 810/812 fails a certain number of times over a given time period, or is otherwise determined suboptimal, wherein suboptimal performance is determined by reference to the operating conditions. Reversion back to the primary WAN 810/812 may occur after a certain interval, after a user input, or based on the operating conditions. In some embodiments, the gateway 806 may maintain a record of network downtime, whether for use in the gateway 806's WAN 810/812 selection operations, or otherwise.

In various embodiments, gateway 806 may also be adapted to determine the unavailability, or failure, of a WAN 810/812 connection. For example, gateway 806 may use a ping utility in the context of determining unavailability of a WAN 810/812 connection. First, gateway 806 may configure or facilitate the configuration of a ping address and interval. If a ping is unsuccessful, gateway 806 may send another ping, or a number of pings. If gateway 806 sends a number of pings, and the pings are unsuccessful, gateway 806 may then route traffic over a secondary WAN 810/812. Gateway 806 may continue to ping the primary WAN 810/812, with the gateway 806 rerouting traffic over the primary WAN 810/812 connection once it has been reestablished. In other embodiments, a ping utility may be used in another manner to determine the unavailability of a WAN 810/812 (primary, secondary, or otherwise). In various other embodiments, other methods for determining the unavailability of a WAN 810/812 (primary, secondary, or otherwise) may be used. For example, drivers of gateway 806 may automatically determine the unavailability of a WAN 810/812 in the manner described above.

Figure 9A:
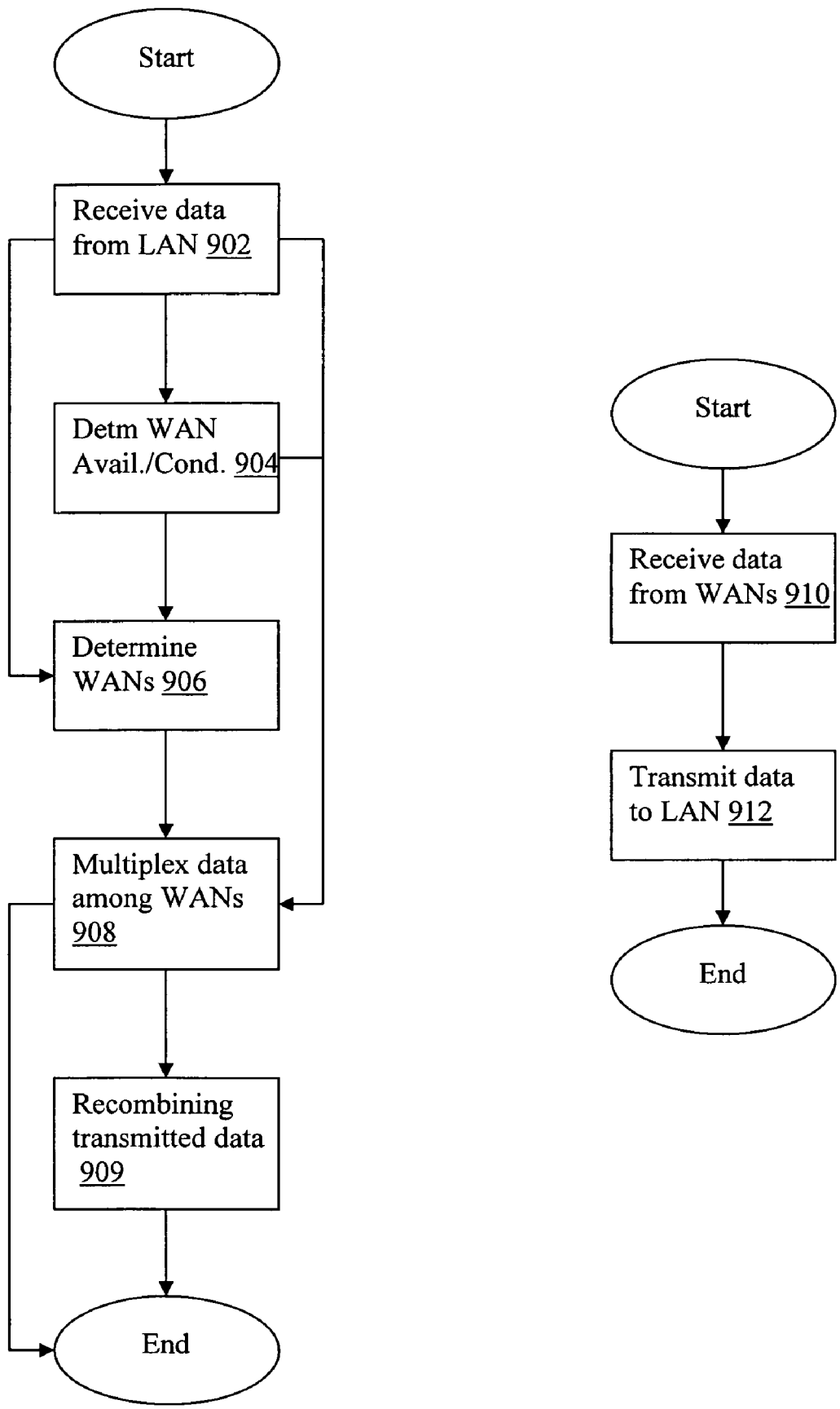
FIGS. 9a-9b illustrate operational flows for transmitting data from a LAN to one or more WANs, and from one or more WANs to a LAN, in accordance with various embodiments.
Figure 9B:
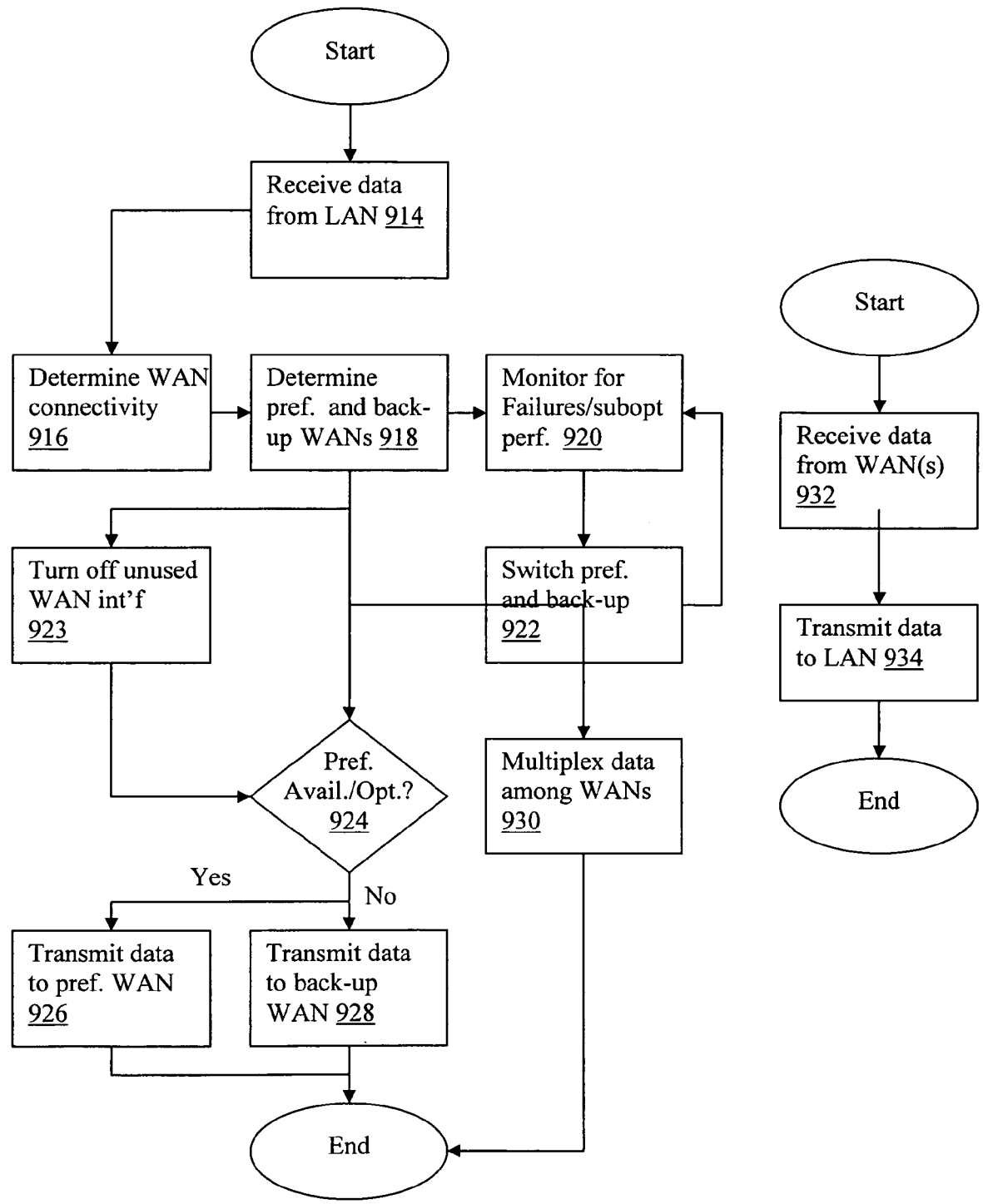
Figure 10:
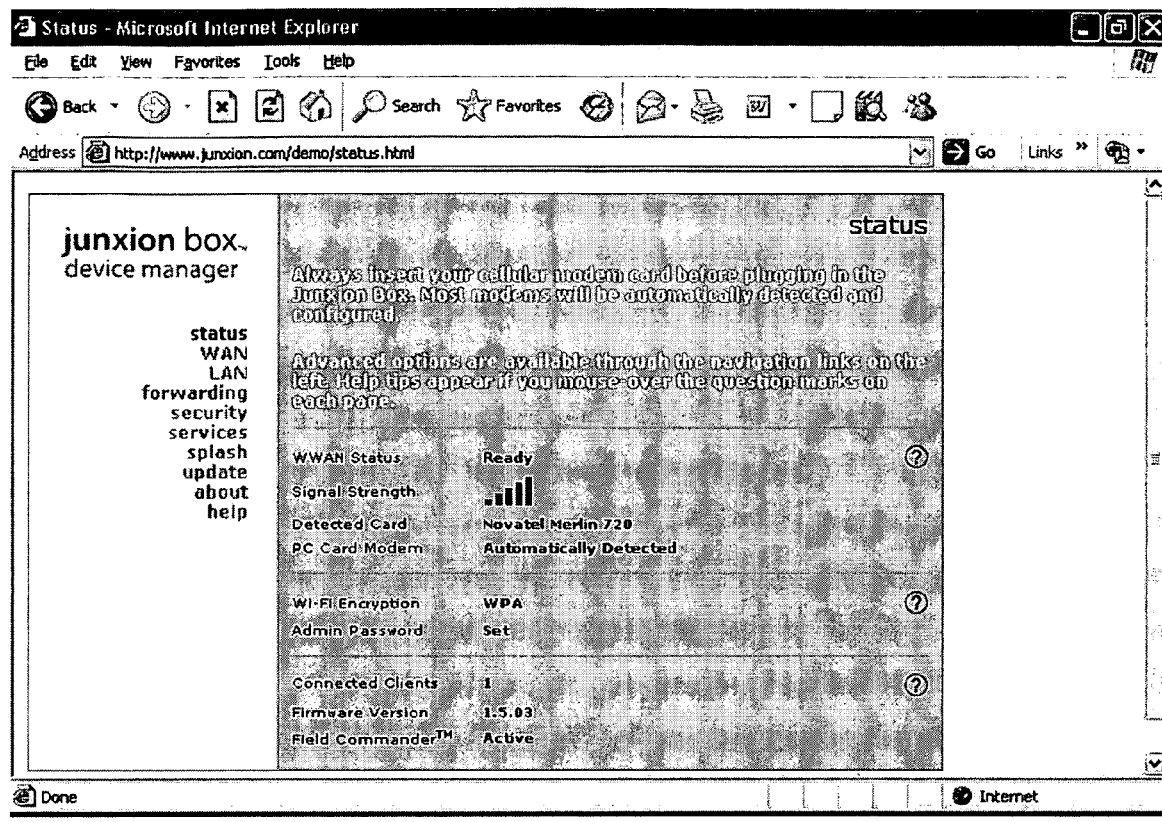
FIGS. 10-17 illustrate various graphical user interfaces associated with the Gateway, in accordance with various embodiments of the invention.

FIGS. 9*a*-9*b* illustrate operational flows for transmitting data from a LAN to one or more WANs, and from one or more WANs to a LAN, in accordance with various embodiments. As illustrated by FIG. 9*a*, a gateway may receive data from one or more devices of a LAN, block 902, through a LAN interface of the gateway. Upon receiving the data, the gateway may determine which WANs of a plurality of WANs associated with WAN interfaces of the gateway are available, block 904. In some embodiments, the gateway may determine the availability of a WAN by pinging a network address of a device connected to the WAN, or by automatically detecting loss of a WAN connection through a gateway driver, as described above. In one embodiment, the gateway may also determine operating conditions of a WAN, such as signal strength and throughput. After determining which of the WANs are available or have certain operating conditions, the gateway may determine a number of the WANs to use to transmit the received data to one or more devices available through one or more of the WAN connections, block 906. For example, if the data includes a large file, the gateway may determine a large number of WANs is desirable for multiplexing the data. If, on the other hand, the data includes only a small file, the gateway may determine only one or a couple WANs for multiplexing the data. Upon determining the number of WANs, the gateway may simultaneously transmit (multiplex) the data to the one or more devices through the number of determined WANs, block 908. In one embodiment, a server accessible through the WANs may be substituted to receive and recombine the simultaneously transmitted (multiplex) data, and then transmit the combined data to the destination one or more devices, block 909. For example, a data center may be tasked with receiving and recombining the multiple data streams into one data stream so that the recipient devices need not recombine the streams.

In various embodiments, shown by FIG. 9*a*, the gateway may also receive data from one or more of the multiple WANs, block 910, in some embodiments while performing one or more of the operations shown in blocks 902-908. Upon receiving the data, the gateway may transmit the data to one or more devices of the connected LAN, bock 912, which may or may not be the same devices transmitting to the gateway in block 902.

As is shown in FIG. 9*b*, a gateway may receive data from one or more devices of a LAN, block 914, through a LAN interface of the gateway. Upon receiving the data, the gateway may determine which WANs of a plurality of WANs associated with WAN interfaces of the gateway are available and may determine operating conditions of the WANs, block 916. In some embodiments, the gateway may determine the availability of a WAN by pinging a network address of a device connected to the WAN, or by automatically detecting loss of a WAN connection through a gateway driver, as described above. After determining WAN availability and operating conditions, the gateway may determine a preferred WAN and one or more back-up WANs, block 918. In one embodiment, the gateway may make such a determination based on operating conditions. Upon determining the preferred and back-up WANs, the gateway may initiate a monitoring process to monitor usage of the preferred WAN for failures, block 920. If a failure is detected, the gateway may switch the preferred and back-up WANs, block 922, and may then continue monitoring, block 920. In some, embodiments, after determining the WANs, the gateway may turn off any WAN interfaces associated with WANs that will not be currently used, block 923.

In one embodiment, after determining the preferred and back-up WANs, the gateway may determine whether the preferred WAN is currently connected and is operating in an optimal fashion, decision block 924. If the preferred WAN is connected and optimally operating, the gateway may transmit the data to one or more devices through the preferred WAN, block 926. If the preferred WAN is not connected or is operating sub-optimally, the gateway may transmit the data to the one or more devices through a back-up WAN, block 928. In other embodiments, the gateway may transmit data through both the preferred and back-up WANs simultaneously, block 930, the back-up WAN serving as a supplemental WAN. In some embodiments, use of the supplemental WAN may require an authorization.

In various embodiments, shown by FIG. 9*b*, the gateway may also receive data from one or more of the multiple WANs, preferred, back-up, or otherwise, block 932, in some embodiments while performing one or more of the operations shown in blocks 914-930. Upon receiving the data, the gateway may transmit the data to one or more devices of the connected LAN, block 934, which may or may not be the same devices transmitting to the gateway in block 914.

Figure 11:
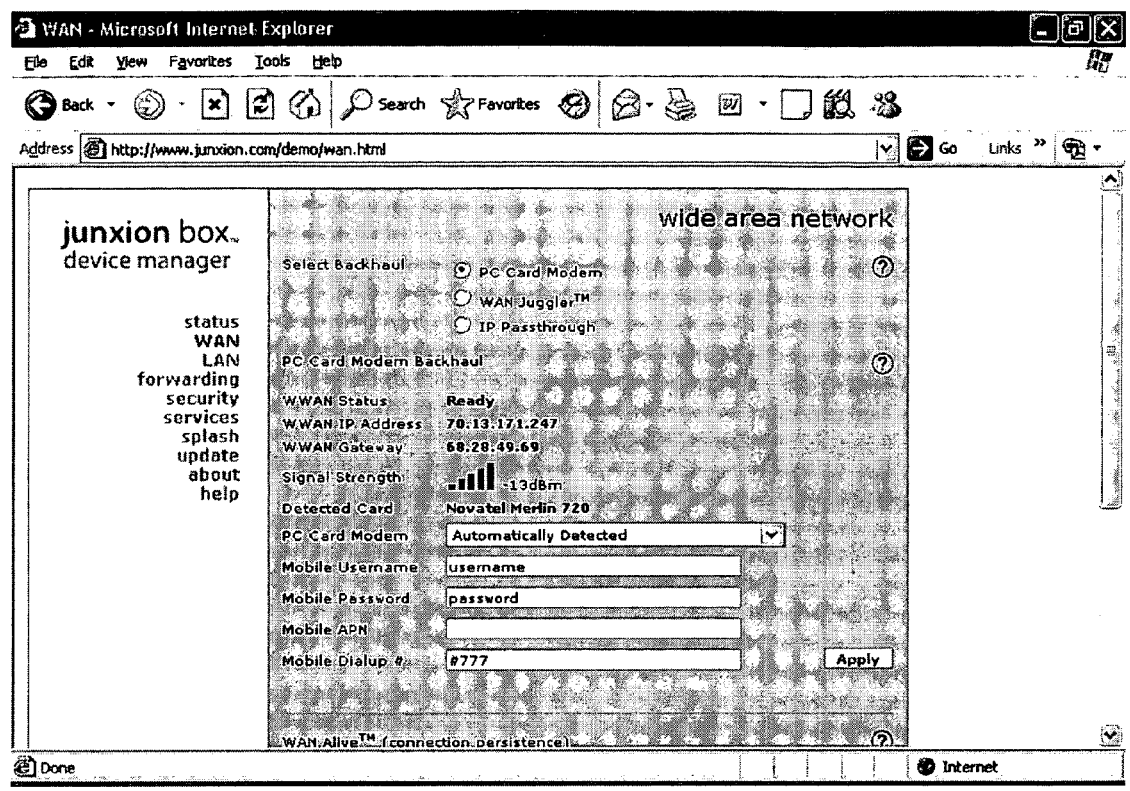
Figure 12:
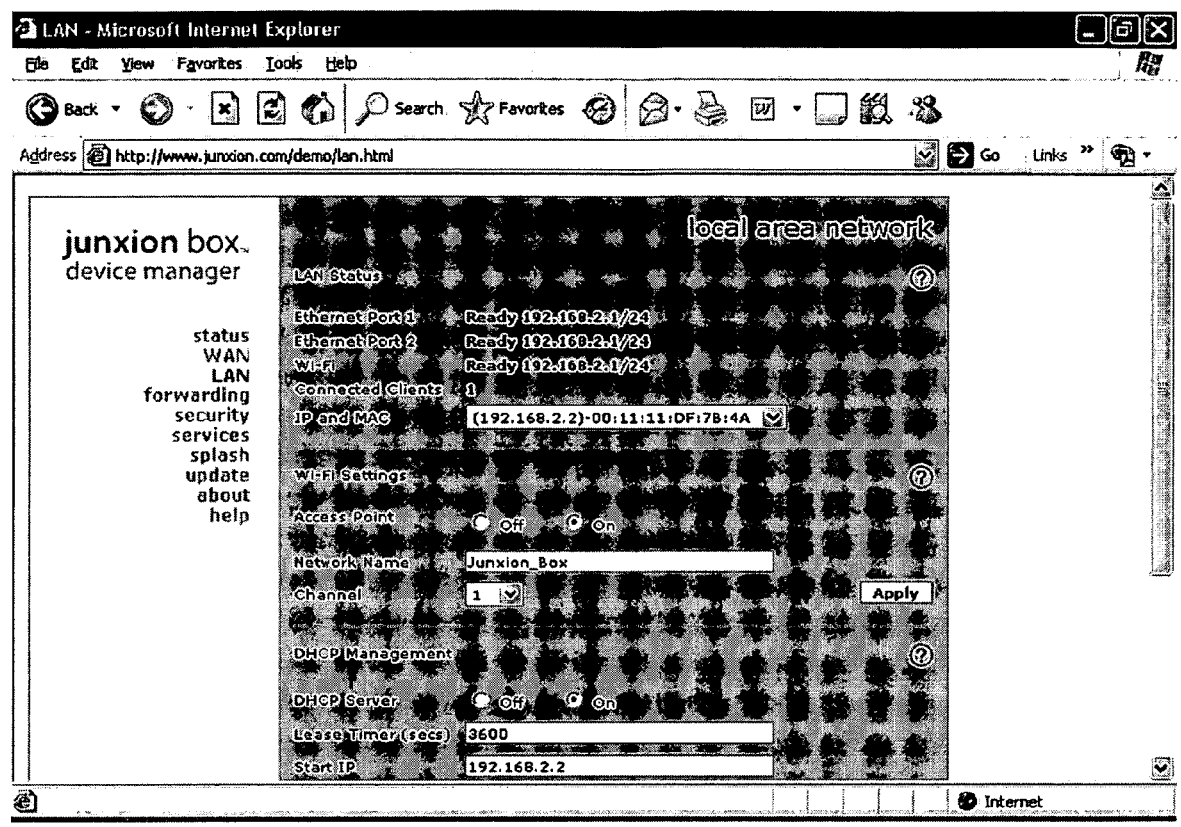
Figure 13:
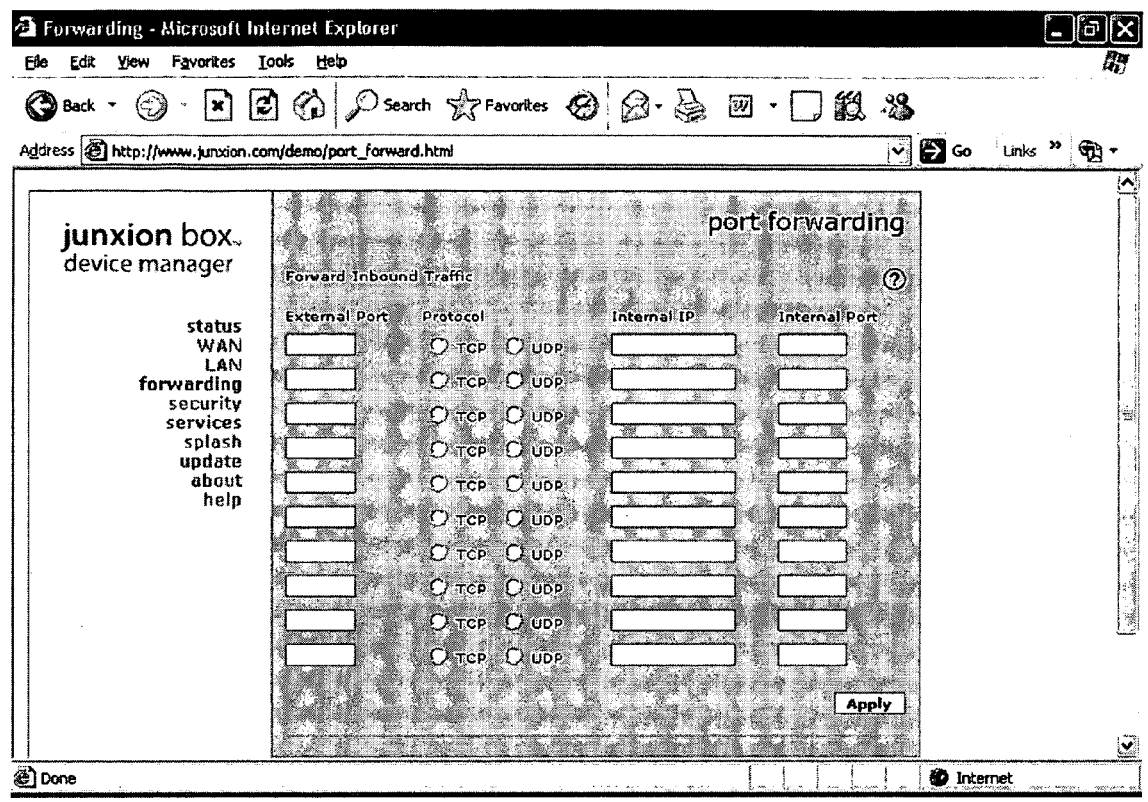
Figure 14:
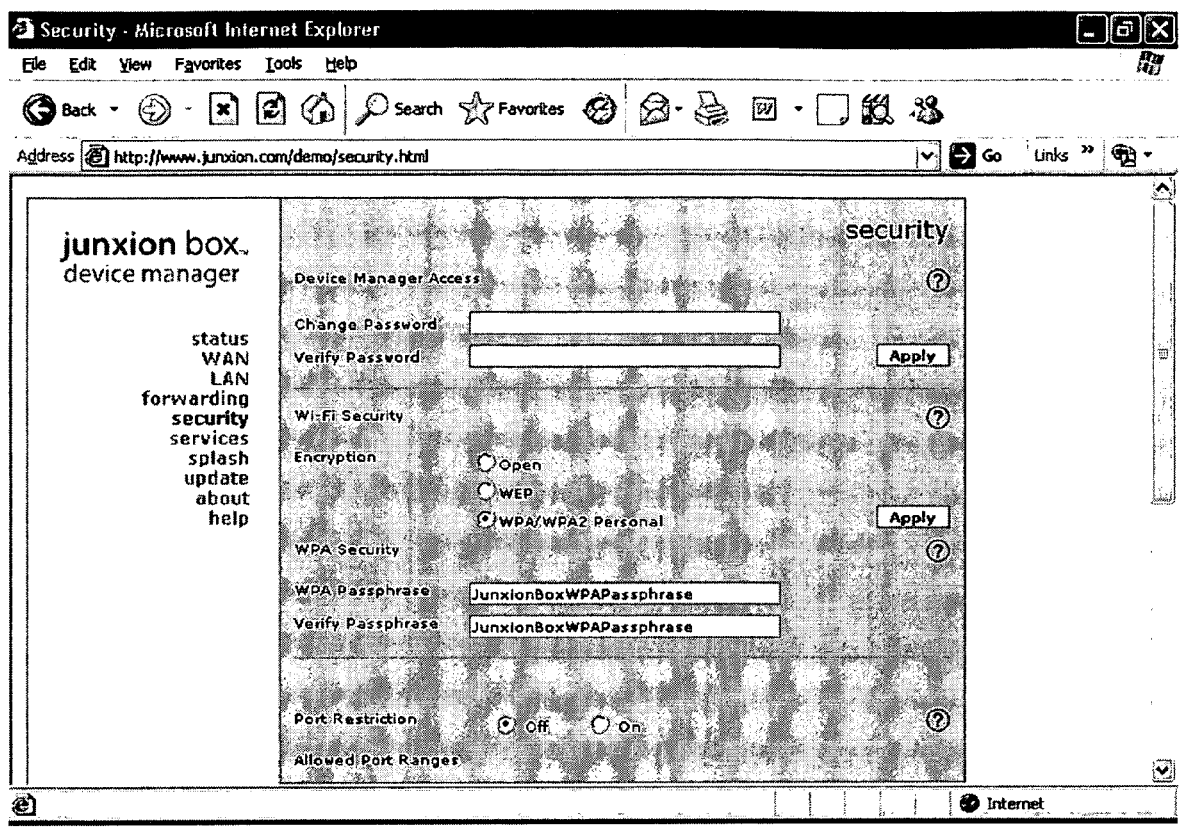
Figure 15:
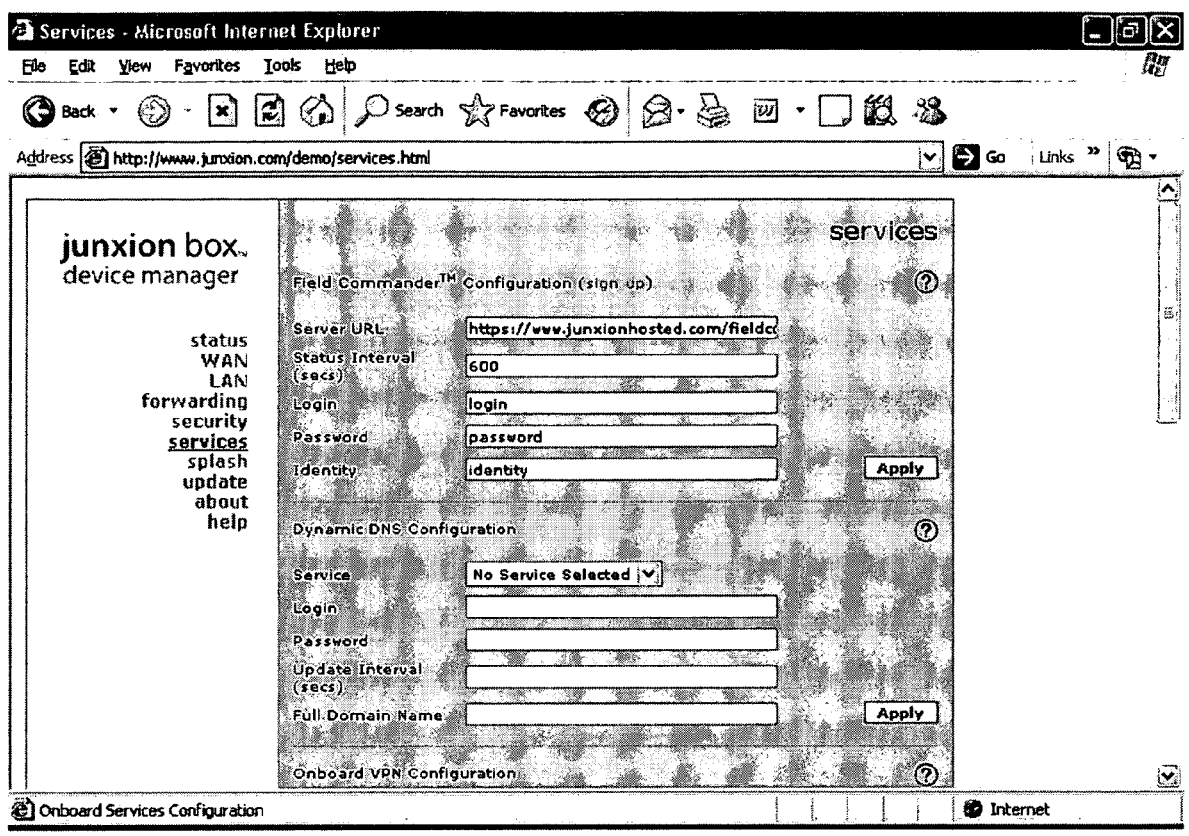
Figure 16:
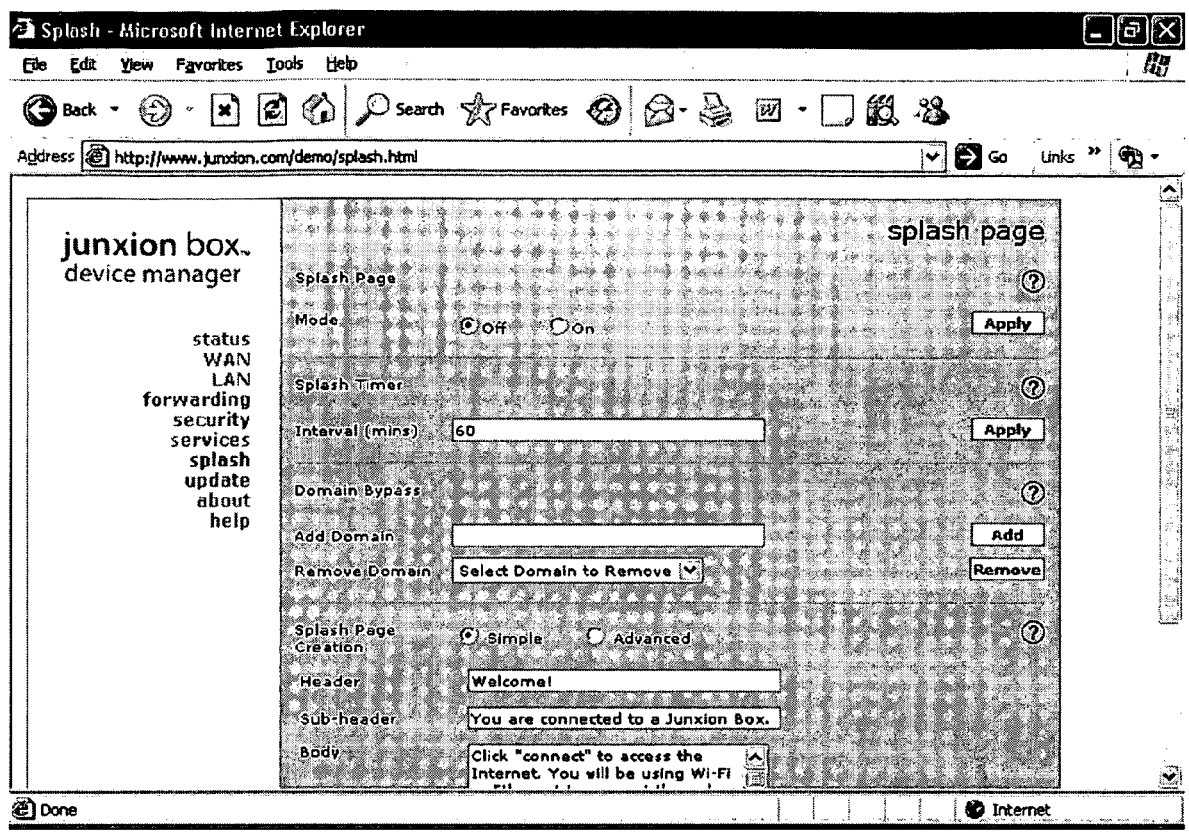
Figure 17:
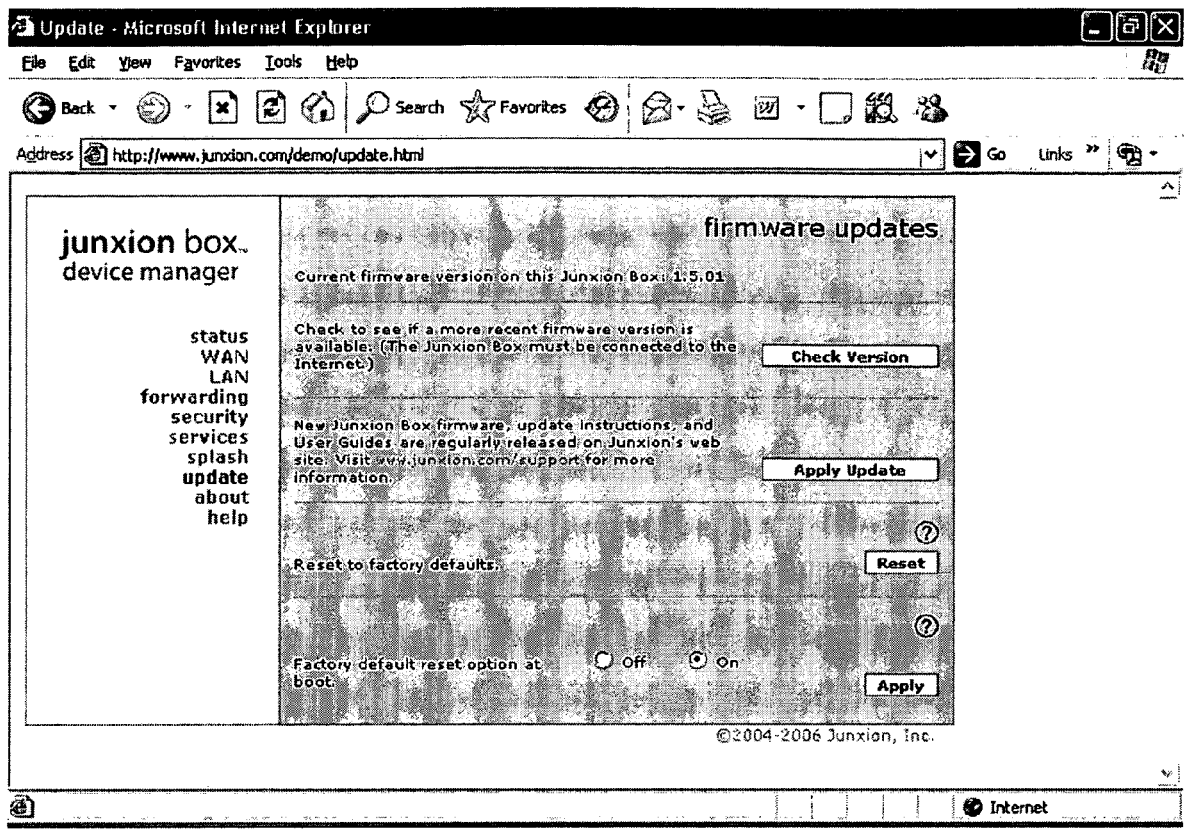

FIGS. 10-17 illustrate various graphical user interfaces associated with the Gateway, in accordance with various embodiments of the invention. In various embodiments, portions of selected graphical user interfaces shown in FIGS. 10-17 may be associated with various discussed functionalities of the Gateway. For example, the user interface of FIG. 11, illustrating a WAN Juggler™, may allow for some aspects of some of the functionality discussed in regard to FIG. 8, in some embodiments. In various embodiments, various discussed functionality of the Gateway may not be associated with any of the graphical user interfaces shown.

Although specific embodiments have been illustrated and described herein, it will be appreciated by those of ordinary skill in the art that a wide variety of alternate and/or equivalent implementations may be substituted for the specific embodiments shown and described, without departing from the scope of the present invention. This application is intended to cover any adaptations or variations of the embodiments discussed herein. Therefore, it is manifestly intended that this invention be limited only by the claims and the equivalents thereof.

What is claimed:

1. An apparatus, comprising:
a gateway configured to:
receive data from one of first one or more devices of a local area network to be transmitted to one of second one or more devices, wherein the gateway includes a plurality of wide area network interfaces respectively communicatively coupled to a plurality of wide area networks, and wherein at least one of the plurality of wide area networks is a wireless wide area network;
determine a preferred wide area network and a back-up wide area network among the plurality of wide area networks based on one or more of an association with a service provider, a throughput, or an operating condition;
obtain approval to transmit through at least one of the wide area networks;
transmit the received data to the one of second one or more devices over the preferred wide area network through one of the plurality of wide area network interfaces correspondingly communicatively coupled to the preferred wide area network; and
in response to the preferred wide area network being unavailable, transmitting, by the gateway, the received data to the one of the second one or more devices over the back-up wide area network through another one of the plurality of wide area network interfaces correspondingly communicatively coupled to the back-up wide area network.

2. The apparatus of claim 1, further comprising a routing engine adapted to determine the availability of each of a first and a second wide area networks by pinging a network address that is gateway to the first or the second wide area networks.

3. The apparatus of claim 2, wherein the operating conditions of the first and the second wide area networks include one or more of a signal strength, a throughput rate, and a wide area network service provider ranking.

4. An apparatus, comprising:
a gateway configured to:
receive data from one of first one or more devices of a local area network to be transmitted to one of second one or more devices, wherein the gateway includes a plurality of wide area network interfaces respectively communicatively coupled to a plurality of wide area networks, and wherein at least one of the plurality of wide area networks is a wireless wide area network;
determine a preferred wide area network and a back-up wide area network among the plurality of wide area networks based on one or more of an association with a service provider, a throughput, or an operating condition; and
simultaneously transmit the received data over the preferred and the back-up wide area networks, by the gateway, through the plurality of wide area network interfaces correspondingly coupled to the preferred wide area network and the back-up wide area network.

5. The apparatus of claim 4, wherein the plurality of wide area network interfaces include at least one of a PCMCIA interface, a miniPCI slot interface, an ExpressCard interface, and a PCI Express interface.

6. The apparatus of claim 4, wherein the plurality of wide area network interfaces include at least one of a USB port interface and an Ethernet port interface.

7. The apparatus of claim 1, wherein at least one of the plurality of wide area network interfaces is a wired wide area networking interface.

8. The apparatus of claim 1, wherein at least one of the plurality of wide area network interfaces is a wireless wide area networking interface.

9. A method comprising:
receiving, by a gateway, data from one of first one or more devices of a local area network to be transmitted to one of second one or more devices, wherein the gateway includes a plurality of wide area network interfaces respectively communicatively coupled to a plurality of wide area networks, and wherein at least one of the plurality of wide area networks is a wireless wide area network;
determining, by the gateway, a preferred wide area network and a back-up wide area network among the plurality of wide area networks based on one or more of an association with a service provider, a throughput, or an operating condition;
obtaining, by the gateway, approval to transmit through at least one of the wide area networks;
transmitting, by the gateway, the received data to the one of second one or more devices over the preferred wide area network through one of the plurality of wide area network interfaces correspondingly communicatively coupled to the preferred wide area network; and
in response to the preferred wide area network being unavailable, transmitting, by the gateway, the received data to the one of the second one or more devices over the back-up wide area network through another one of the plurality of wide area network interfaces correspondingly communicatively coupled to the back-up wide area network.

10. The method of claim 9, wherein the preferred wide area network is a wide area network associated with a preferred service provider.

11. The method of claim 10, wherein the preferred wide area network is the wide area network associated with the preferred service provider unless a higher throughput is achievable through another connected wide area network.

12. The method of claim 9, further comprising monitoring, by the gateway, a number of network failures of the preferred wide area network; and switching, by the gateway, the preferred and the back-up wide area networks in response to the number of network failures of the preferred wide area network being higher than a threshold.

13. The method of claim 9, further comprising determining, by the gateway, availability of one of the preferred and/or back-up wide area networks by pinging a network address gateway to the one of the preferred and/or back-up wide area networks.

14. The method of claim 9, further comprising turning off a wide area networking interface communicatively coupled to one of the plurality of wide area networks that is not being used to transmit and receive data.

15. A method, comprising:
receiving, by a gateway, data from one of first one or more devices of a local area network to be transmitted to one of second one or more devices, wherein the gateway includes a plurality of wide area network interfaces respectively communicatively coupled to a plurality of wide area networks, and wherein at least one of the plurality of wide area networks is a wireless wide area network;
determining, by the gateway, a preferred wide area network and a back-up wide area network among the plurality of wide area networks based on one or more of an association with a service provider, a throughput, or an operating condition; and
simultaneously transmitting the received data over the preferred and the back-up wide area networks, by the gateway, through the plurality of wide area network interfaces correspondingly coupled to the preferred wide area network and the back-up wide area network.

16. The method of claim 15, wherein the operating condition is selected from a group consisting of a signal strength, a throughput, and a service provider ranking.

17. The method of claim 15, wherein the preferred wide area network is a wired wide area network, and the back-up wide area network is a wireless wide area network.

18. The method of claim 15, wherein the preferred wide area network is a wireless wide area network, and the back-up wide area network is a wired wide area network.

19. An article of manufacture comprising:
a non-transitory, tangible, machine accessible storage medium having stored thereon a plurality of machine executable instructions, wherein the instructions are configured to cause a gateway, in response to execution of the instructions by the gateway, to perform operations comprising:
receiving data from one of first one or more devices of a local area network to be transmitted to one of second one or more devices, wherein the gateway includes a plurality of wide area network interfaces respectively communicatively coupled to a plurality of wide area networks, and wherein at least one of the plurality of wide area networks is a wireless wide area network;
determining a preferred wide area network and a back-up wide area network among the plurality of wide area networks based on one or more of an association with a service provider, a throughput, or an operating condition;
obtaining approval to transmit through at least one of the wide area networks;
transmitting the received data to the one of second one or more devices over the preferred wide area network through one of the plurality of wide area network interfaces correspondingly communicatively coupled to the preferred wide area network; and
in response to the preferred wide area network being unavailable, transmitting, the received data to the one of the second one or more devices over the back-up wide area network through another one of the plurality of wide area network interfaces correspondingly communicatively coupled to the back-up wide area network.

20. The article of claim 19, wherein the operations further comprise determining availability of respective ones of the plurality of wide area networks by attempting to ping a network address corresponding to a gateway of the respective ones of the plurality of wide area networks.

21. The article of claim 19, wherein the operations further comprise determining the one or more operating conditions of one of the plurality of wide area networks, the operating conditions including one or more of a signal strength, a throughput rate, and a wide are network service provider ranking.

22. The apparatus of claim 4, wherein the gateway further comprises an additional wide area networking interface adapted to receive data from, and transmit data to the second one or more devices, through a corresponding wide area network, and the routing engine is further coupled to the additional wide area networking interface, and further configured to select the corresponding wide area network as a non-preferred alternative to the preferred and the back up wide area networks, and transmit the received data from said one of the first one or more devices of the local area network to said one of the second one or more devices though the additional wide area network interface in response to both the preferred and the back up wide area networks being unavailable.

23. An article of manufacture comprising:
a non-transitory, tangible, machine-accessible storage medium having stored thereon a plurality of machine executable instructions, wherein the instructions are configured to cause a gateway, in response to execution of the instructions by the gateway, to perform operations comprising:
receiving data from one of first one or more devices of a local area network to be transmitted to one of second one or more devices, wherein the gateway includes a plurality of wide area network interfaces respectively communicatively coupled to a plurality of wide area networks, and wherein at least one of the plurality of wide area networks is a wireless wide area network;
determining a preferred wide area network and a back-up wide area network among the plurality of wide area networks based on one or more of an association with a service provider, a throughput, or an operating condition; and
simultaneously transmitting the received data over the preferred and the back-up wide area networks through the plurality of wide area network interfaces correspondingly coupled to the preferred wide area network and the back-up wide area network.

24. The article of claim 23, wherein the operations further comprise monitoring a number of network failures of the preferred wide area network; and switching the preferred and the back-up wide area networks in response to the number of network failures of the preferred wide area network being higher than a threshold.

25. The article of claim 23, wherein the preferred wide area network is a wired wide area network, and the back-up wide area network is a wireless wide area network.

* * * * *

UNITED STATES PATENT AND TRADEMARK OFFICE
CERTIFICATE OF CORRECTION

PATENT NO. : 8,121,071 B2
APPLICATION NO. : 11/595380
DATED : February 21, 2012
INVENTOR(S) : Peter Polson It is certified that error appears in the above-identified patent and that said Letters Patent is hereby corrected as shown below:

In the Claims

At Column 18, Line 14, Claim 21, should be corrected from "...a wide are network..." to --...a wide area network...--.

At Column 18, Lines 23-24, Claim 22, should be corrected from "...the back up wide area networks,..." to --...the back-up wide area networks,...--.

At Column 18, Lines 26-27, Claim 22, should be corrected from "...one or more devices though the additional wide area network interface..." to --...one or more devices through the additional wide area network interface...--.

At Column 18, Line 28, Claim 22, should be corrected from "...the back up wide area networks..." to --...the back-up wide area networks...--.

Signed and Sealed this
Tenth Day of December, 2013

Margaret A. Focarino
*Commissioner for Patents of the United States Patent and Trademark Office*